United States Patent
Hodjat et al.

(10) Patent No.: US 7,558,731 B1
(45) Date of Patent: Jul. 7, 2009

(54) CONTEXT REACTIVE NATURAL-LANGUAGE BASED GRAPHICAL USER INTERFACE

(75) Inventors: Siamak Hodjat, San Jose, CA (US); Nicholas K. Treadgold, Tanunda (AU); Babak Hodjat, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 796 days.

(21) Appl. No.: 11/094,327

(22) Filed: Mar. 30, 2005

(51) Int. Cl.
 *G10L 15/00* (2006.01)
(52) U.S. Cl. .................................................... 704/257
(58) Field of Classification Search .................... 704/3, 704/9, 257, 270.1; 709/201, 202; 706/10, 706/11
 See application file for complete search history.

(56) References Cited

U.S. PATENT DOCUMENTS

| | | | |
|---|---|---|---|
| 4,688,195 A | | 8/1987 | Thompson et al. |
| 4,829,423 A | | 5/1989 | Tennant et al. |
| 5,083,268 A | | 1/1992 | Hemphill et al. |
| 5,584,024 A | * | 12/1996 | Shwartz ......................... 707/4 |
| 5,799,268 A | * | 8/1998 | Boguraev ...................... 704/9 |
| 5,812,840 A | * | 9/1998 | Shwartz ......................... 707/4 |
| 6,144,989 A | * | 11/2000 | Hodjat et al. ................ 709/202 |
| 6,751,614 B1 | * | 6/2004 | Rao ............................... 707/5 |
| 6,772,190 B2 | * | 8/2004 | Hodjat et al. ................ 709/202 |
| 6,785,671 B1 | | 8/2004 | Bailey et al. |
| 6,826,566 B2 | * | 11/2004 | Lewak et al. ................... 707/4 |
| 7,027,975 B1 | | 4/2006 | Pazandak et al. |
| 7,231,343 B1 | * | 6/2007 | Treadgold et al. ............. 704/9 |

OTHER PUBLICATIONS

Office Action mailed Sep. 13, 2005, in U.S. Appl. No. 10/133,580, filed Apr. 24, 2002.
Response A to Office Action, filed in the USPTO on Nov. 14, 2005, in U.S. Appl. No. 10/133,580, filed Apr. 24, 2002.
Office Action mailed Jan. 24, 2006, in U.S. Appl. No. 10/133,580, filed Apr. 24, 2002.
Response B to Office Action, filed in the USPTO on Apr. 20, 2006, in U.S. Appl. No. 10/133,580, filed Apr. 24, 2002.
Final Office Action mailed Jul. 19, 2006, in U.S. Appl. No. 10/133,580, filed Apr. 24, 2002.
Response C to Final Office Action, filed in the USPTO on Sep. 11, 2006, in U.S. Appl. No. 10/133,580, filed Apr. 24, 2002.
Response D to Final Office Action, filed in the USPTO on Oct. 19, 2006, in U.S. Appl. No. 10/133,580, filed Apr. 24, 2002.
Advisory Action mailed Sep. 25, 2006, in U.S. Appl. No. 10/133,580, filed Apr. 24, 2002.
Office Action mailed Nov. 2, 2006, in U.S. Appl. No. 10/133,580, filed Apr. 24, 2002.

(Continued)

*Primary Examiner*—Michael N Opsasnick
(74) *Attorney, Agent, or Firm*—Edell, Shapiro & Finnan, LLC

(57) ABSTRACT

Roughly described, a context reactive user interface which offers user-selectable on-screen choices or hints to help the user follow up in the context of his or her previous interactions. Alternatively or additionally, the system can offer on-screen choices which, when selected by the user, can invoke one or more back-end applications with entry fields pre-filled from the user's previous interactions or from other contextual information.

6 Claims, 11 Drawing Sheets

OTHER PUBLICATIONS

Response E to Office Action, filed in the USPTO on Feb. 2, 2007, in U.S. Appl. No. 10/133,580, filed Apr. 24, 2002.
Office Action mailed Apr. 17, 2007, in U.S. Appl. No. 10/133,580, filed Apr. 24, 2002.
Response F to Office Action, filed in the USPTO on Jul. 17, 2007, in U.S. Appl. No. 10/133,580, filed Apr. 24, 2002.
Interview Summary mailed Jul. 24, 2007, in U.S. Appl. No. 10/133,580, filed Apr. 24, 2002.
Office Action mailed Oct. 9, 2007, in U.S. Appl. No. 10/133,580, filed Apr. 24, 2002.
Thomas Kuhme, "Adaptive Action Prompting—A Complementary Aid to Support Task-Oriented Interaction in Explorative User Interfaces", Siemens Corporate Research and Development Otto-Hahn-Ring 6, 8000 Munich 8, Germany, email: kuehme@zfe.siemens.de, 1993.

* cited by examiner

CONTEXT REACTIVE NATURAL-LANGUAGE BASED GRAPHICAL USER INTERFACE

BACKGROUND

1. Field of the Invention

The invention relates to user-machine interfaces, and more particularly, to techniques for suggesting contextually relevant follow-up hints to improve the effectiveness of natural language user interaction with a back end application.

2. Related Art and Summary of the Invention

Mobile devices are becoming extremely popular and capable, yet they suffer from at least two user-interface-related problems that are holding back further deployment and simplicity of use.

First, because of the relatively small form factor and entry-limitations of mobile devices, simply resizing a Graphical User Interface (GUI) designed for a desktop experience has not been sufficient. Entirely new interfaces have been designed, which lack the luxury of multiple windows, task-bars, quick launch pads and other conveniences and otherwise limit the amount of information and the number of user-selectable choices present on the screen. As a result, multiple interactions have become necessary in many cases for the user to reach a desired point in a desired application. But mobile devices also can suffer from lengthy delays between successive interactions with a back-end application, rendering a solution of multiple interactions sub-optimal. The recent introduction of natural language interfaces for mobile devices has helped, since they enable a user to go directly to a desired menu item or application screen without multiple interactions with a back-end application and without having to know menu structures or application organizations in advance. However, they still require the user to enter information affirmatively. It would be desirable if a user interface for a mobile device could offer the advantages of both user-selectable on-screen choices and natural language interaction.

Second, while numerous applications are available for use on mobile devices (e.g., Location Based Services, infotainment, enterprise applications), many have not yet become popular or widely used. Partly this is due to a lack of integration with other more important applications (i.e., contacts, calendar, email, phone). Integration here is generally meant as having access to an appropriate function in one application from a certain point in the other. For example, while reading an email on a RIM Blackberry, a user is able to click on the sender to look it up in the contact book. For a map application to be integrated into the RIM Blackberry application set, one would expect to be able to easily get a map of a contact while viewing the contact information. Historically, many of the most successful mobile device operating systems have been the ones that integrate more applications and services better: contacts and calendar in the case of early Palm devices, and contacts, calendar, email, and phone in the case of RIM Blackberries, for example.

In the past, integration of multiple applications has often required cooperative development between the different vendors or development teams, or development of inter-application standards to which the different applications must subscribe. It would be highly desirable if effective integration could be accomplished in a user interface for a mobile device rather than requiring cooperation by different development teams.

According to the invention, roughly described, the above problems are addressed by the use of a context reactive user interface which offers user-selectable on-screen choices or hints to help the user follow up in the context of his or her previous interactions. Alternatively or additionally, the system can offer certain on-screen choices which, when selected by the user, can invoke one or more back-end applications with entry fields pre-filled from the user's previous interactions or from other contextual information.

In an embodiment, user input can be either by choosing user-selectable on-screen choices or by entering natural language input, whichever the user prefers at a given point in the interaction. The natural language input is interpreted by an agent network such as that described in U.S. Pat. No. 6,144,989, incorporated by reference herein. In such a network, sometimes referred to generally herein as an AAOSA agent network, user input is provided to the natural language interpreter in a predefined format, such as a sequence of tokens, often in the form of text words and other indicators. The interpreter parses the input and attempts to discern from it the user's intent relative to the back-end application(s). The agent network is organized as a hierarchy of semantic domains, with each agent responsible for recognizing only references within its own domain. Each agent processes requests either directly or by combining its processing with results produced by other agents. The network structure defines the communication paths between agents, which in turn determine the way agents receive requests and provide responses.

The agent network operates by passing requests from agent to agent. A request begins at the root of the hierarchy and flows down (downchain) to other agents. Agents examine the request and decide for themselves whether they have anything to contribute. Response flow back upchain using the same message paths as the request. Since one agent can have more than one upchain connection, a downchain agent can receive the same request from every agent above it. It will only process the request once, however, and will send the same response to all of its upchain agents.

The network processes a natural language request in two phases. Phase one relates to interpretation of the request—the determination of the user's intent. Phase two is the actuation phase, in which the network uses its understanding of the request to generate a command to a back-end application. Phase one begins when the top-level agent receives the request from the user. It passes the request to its downchain agents, which pass it along to their downchain agents, and so on until every agent has seen the request. Each node examines the request, deciding whether it recognizes anything in the request that it knows how to process. If the agent sees anything, it makes a claim on whatever part of the request it thinks it understands.

An agent may make multiple claims on multiple parts of the request, including claims on overlapping parts of the request. If an agent sees nothing of interest in the request, it sends an explicit "no claim" message upchain. An upchain agent examines the claims it receives and may make its own claim based on the downchain agent claims; it may reject those claims based on its own, better understanding of the request and make a claim unrelated to those it received; or it may decide that neither it nor its downchain agents have anything to contribute and send a "no claim" message to its upchain agents. In this way claims and "no claim" responses travel up the network tree until they reach the top-level agent.

Often an agent will receive multiple claims returned from the agents below it. A set of rules is used to determine the relative strength of each claim. It is up to the upchain agent to decide whether to pass along multiple claims or to send only the strongest. The top-level agent makes the final selection among competing claims, selecting a set of one or more "best" claims. The set of winning claims can include more than one claim, so long as they do not conflict with each other. For example, user input such as, "Find emails to John and forward them to Jane" might generate a set of two winning claims: "Find emails to John" and "Forward selected emails to Jane". Each claim identifies the agents that contributed to it, and therefore represents an "interpretation path" through the agent network.

Once the top-level agent has selected a set of winning claims, it begins the second phase: the generation of the action response (e.g., a command to an application). This time, the request is passed only to those agents are included in one of the winning interpretation paths. Each included agent has its chance to contribute to some part of the command.

AAOSA is one example of a natural language interpreter; another type that can be used is Nuance Communications' Nuance Version 8 ("Say Anything") product, described in Nuance Communications, "Developing Flexible Say Anything Grammars, Nuance Speech University Student Guide" (2001), incorporated herein by reference. AAOSA is preferred, however, because the semantic relationships relevant to the back-end applications are already embodied in the structure of the agent network. These semantic relationships can be used to develop context-sensitive follow-up choices in which the user might be interested as described hereinafter. The agent network can be thought of as including a "database" of semantic relationships, where the term "database" as used herein does not necessarily imply any unity of structure. For example, two or more separate databases, when considered together, still constitute a "database" as that term is used herein. If another type of natural language interpreter supports hierarchies of semantic relationships similarly to AAOSA, or if semantic relationships are maintained elsewhere in a separate database, then other types of natural language interpreters can be used.

Follow-up choices (also referred to herein as "hints") can be developed as pieces of information that have an association with the action previously taken by the user. For example if the user searches for a contact, then "Sending emails to the contact", and "setting an appointment with the contact" may be associated with the user's action and may be provided as hints for follow-up. A hint has value in that when it is presented to the user in an appropriate context, it helps the user clarify a command or carry out related commands. Hints can also be used to help the user learn about the back-end application. Generally hints can be presented as either a natural language sentence, as icons, or as menus.

Hints in an AAOSA-based embodiment can be derived from the inter-agent relationships in the agent network. In particular, if a winning interpretation path includes a chain of one or more agents in the network, and if the agents are organized in the network according to appropriate semantic relationships, then alternative paths which differ from the interpretation paths in limited ways likely will represent reasonable follow-up choices in the current context of the user interaction.

For example, in one embodiment, agents are of specific categories or "types", depending on the semantic function of the agent's domain in natural language user input. Preferably but not necessarily, three main semantic categories are used: commands, objects and fields. These categorizations are chosen because they tend to correspond to the command structures used in a wide variety of back-end applications. That is, commands in many applications often involve a command (an action that the user desires to be performed), an object (the structure on which the action should be performed), and fields (within the specified object). An advantageous organization for an AAOSA agent network therefore places command agents (agents whose function is to recognize the command part of user input) at a first level in the hierarchy, just below the root or top agent, object agents at a second level in the hierarchy, and field agents at a third level in the hierarchy. All command agents are immediately downchain of the top agent, and all the object agents in the second level are immediately downchain of at least one command agent. All the field agents in the third level are immediately downchain of at least one object agent in the second level. In an embodiment, multiple object levels precede the field level. Variations of this organization are also possible, and some of them are described below. Other very different organizations are also possible.

Using the command, object, field agent organization, user input generally results in winning interpretation paths that include either only a command agent, or a command agent and one or more object agents, or a command agent, one or more object agents, and one or more field agents. At least four kinds of hints can be generated based on this organization. These include "General" hints, "Applicable Objects" hints, "Relevant Fields" hints and "Relevant Commands" hints. All are described in more detail below, but all involve suggesting either a next agent downchain from the deepest agent in an interpretation path, or an alternative agent which is a sibling or an upchain (or other predefined type of relationship) of an agent that does exist in an interpretation path.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Implementation Overview

Figure 1:
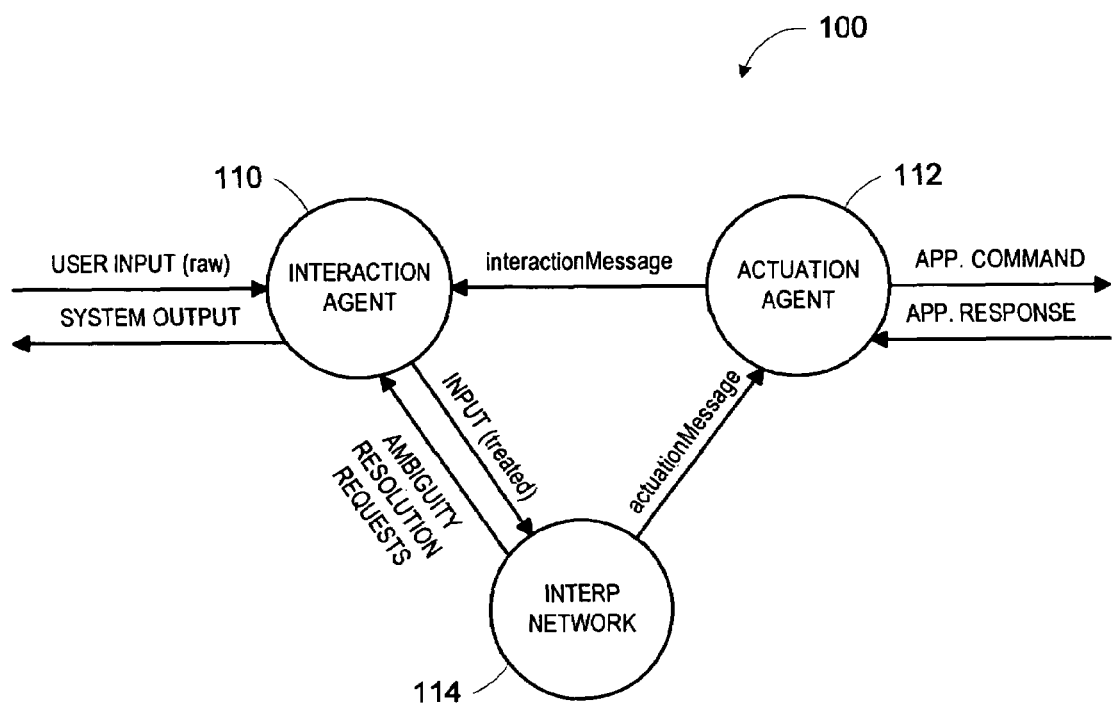
FIG. 1 is an overview of a system incorporating the invention.

FIG. 1 is an overview of a system 100 incorporating the invention. The system 100 includes an interaction agent 110 which controls all communication with the user, an actuation agent 112 which controls all communication with the back-end application, and the natural language interpretation network 114 itself. The hints engine is maintained mostly in the actuation agent 112, but could in a different embodiment be maintained by the interaction agent 112, by an agent or agents in the interpretation network 114, and/or by other components of the system.

User input arrives into the system in any desired form, such as text typed by the user, or sound samples, or input already partially processed. In the present embodiment the user input arrives in the form of a text string. In general, it can be said that user input arrives as a sequence of one or more "tokens", which can include words, sub-words, punctuation, sounds and/or other speech components. The user input is provided first to the Interaction Agent 110, which performs certain pre-processing on the token sequence. The resulting sequence is provided to the natural language interpreter (NLI) 114 for interpretation. The NLI 114 attempts to discern the user's intent from the user input token sequence, and outputs its resulting interpretation to the Actuation Agent 112. Often the interpretation is forwarded on toward a back-end application as commands or queries, but in some embodiments and in some situations (such as where the NLI 114 failed to interpret some or all of the input token sequence), transmission toward the back-end application may be withheld. (The terms "command" and "query" are used interchangeably herein.)

Natural Language Interpreter

The natural language interpreter 114 attempts to discern meaning from the user input token sequence even in the face of partial, unexpected or ungrammatical utterances. It accomplishes this in part by attempting to spot concepts in an incoming token sequence, typically by reference to specific keywords or classes of keywords. Some of the keywords are the concepts themselves (like "Monday" in the phrase, "I'll be there on Monday"), and some of the keywords are indicators of where the concept is likely to appear (like "on" in the same phrase). The NLI 114 can be any of a variety of natural language interpreters, including, for example, Nuance Communications' Nuance Version 8 ("Say Anything") product or a platform containing an AAOSA agent network from Dejima, Inc. In Nuance Version 8, the NLI compares the incoming text string to a natural language understanding (NLU) grammar which has been written by a designer to look for specific keywords. For example, in a natural language interface for an airline reservation system, the NLU grammar might look for words such as "depart", "departing", or "leaving from", followed by a city name. In this case the keywords referenced by the natural language interpreter 114 would include the words "depart", "departing", "leaving", "from", as well as a complete list of city names. The city names are usually represented in a sub-grammar in the NLU. In an AAOSA agent network, agents contain policy conditions which either do or do not apply to the incoming text string, and if they do, they make a claim to at least a portion of the incoming text string. Such claims imply a tentative interpretation of part or all of the input string. For example, an agent network might be designed to include policy conditions to look for any of the words "depart", "departing" or "leaving", earlier in the text string than the word "from", which in turn is earlier in the text string than a city name. In this case as well, the keywords referenced by the natural language interpreter 114 would include the words "depart", "departing", "leaving" and "from", as well as a complete list of city names.

While performing the interpretation, the interpretation network 114 may require clarification of the user's input in certain circumstances, such as in the event of a recognized ambiguity, in which case the interpretation network 114 communicates the clarification requests back to the user via the interaction agent 110. The interpretation network 114 maintains context information so that new token sequences received from the user can be properly interpreted as a response to the agent network's clarification requests. The system recognizes user input as a continuation of prior input either through heuristics (such as by creating policies in the agent network to try to recognize continuations), or by the user explicitly flagging the new input as a continuation (such as by checking a "maintain context" checkbox). Once the interpretation network 114 completes an interpretation of one or more input token sequences, it transmits its interpretation in an "actuation" message to the actuation agent 112. The actuation agent 112 forwards the actuation to the back end application in the form required by the back end application. The interpretation network 114 thus allows the user to interact normally, as if the user is interacting with another human being, and the system 100 interprets the user's intent and generates the specific signals and syntax required by the back end application to effect that intent. If the back end application has a response to the user's inquiry or command, or if it initiates its own interaction with the user, the actuation agent 112 communicates this information in an "interaction" message to the interaction agent 110, which forwards it on to the user in the form required by the user's form of communication. The actuation agent 112 also includes any hints in its interaction message, that were generated in response to the interpretation.

As used herein, "developing" or "attempting" a "natural language interpretation" means discerning or attempting to discern, from user input the user's intent relative to the back-end application. The user's intent may be represented in many different forms, but in the present embodiment the user's intent is represented as an object instantiation of a java class, containing properties accessible through class methods which describe generalized commands that the system believes the user intends to apply to the back-end application. The properties of this object can be expressed as an XML string, and for convenience of discussion, that is the representation used hereinafter. Note also that "attempting" a natural language interpretation does not necessarily imply that the attempt fails or fails partially. "Developing" a natural language interpretation, for example, is one of the possible consequences of "attempting" a natural language interpretation.

Figure 2:
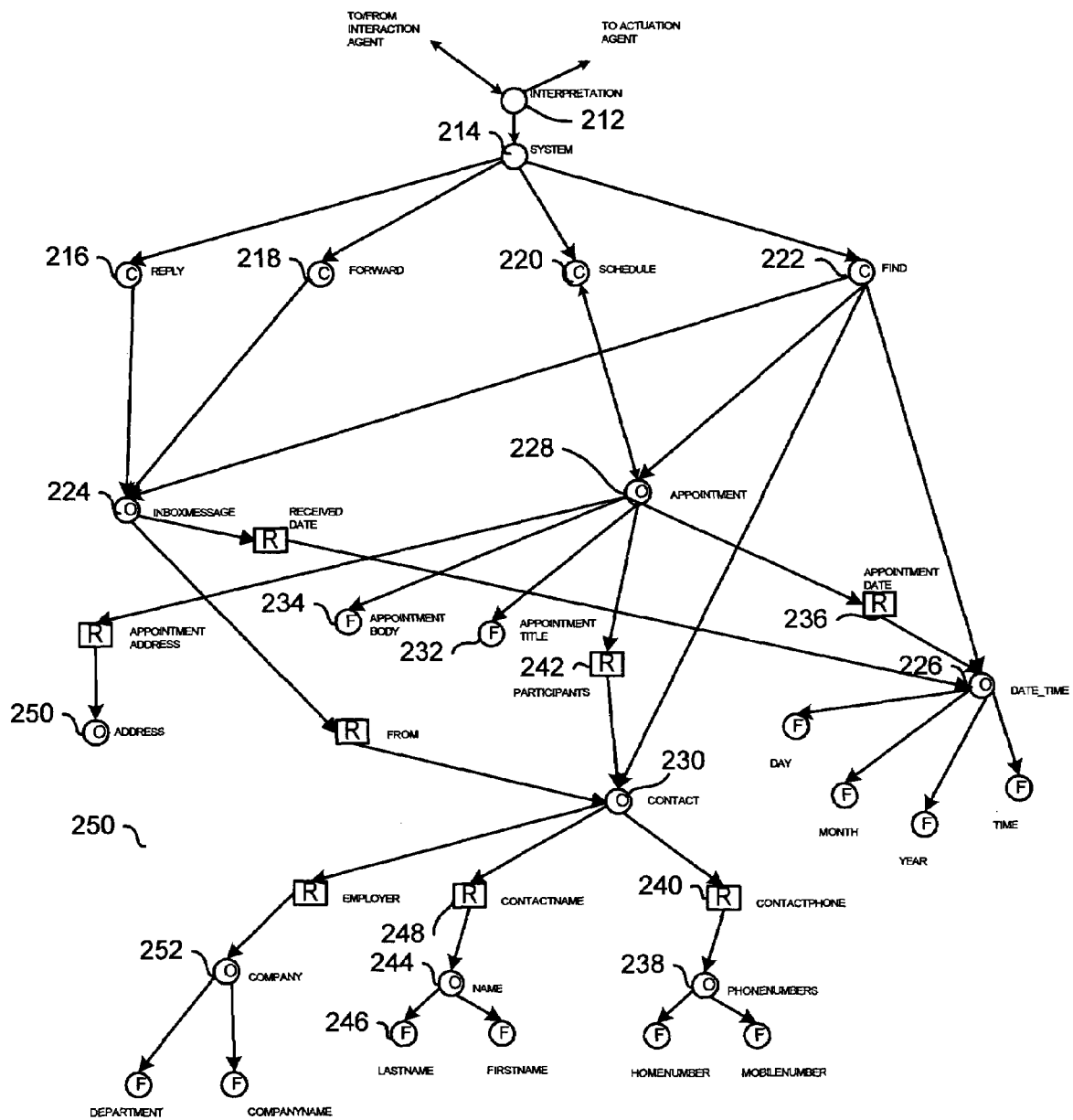
FIG. 2 is a diagram of an example interpretation network of FIG. 1.

FIG. 2 is a diagram of an example interpretation network 114, used for implementing a natural language interface to a back end application that is designed for personal information management. In particular, the back end application in this example can manage emails, appointments and contacts, as well as other objects not shown. The network shown in FIG. 2 has been greatly simplified in order to best illustrate the invention.

Interpretation networks in the present embodiment are defined in an Opal file, which is an XML document that defines certain properties of each of the agents in an agent network. The agents themselves are implemented as instances of java classes and subclasses, and the Opal file specifies, for each agent and among other things, the specific class or subclasses from which the agent is to be instantiated, which other agents each particular agent listens to for each particular kind of message, as well as (for most agents) a set of one or more "interpretation policies" which implement the interpretation task for which the particular agent is responsible. The Opal file is used by an Opal converter program at system startup time to instantiate the entire agent network such as network 114.

An interpretation policy contains, among other things, a policy condition and a policy action. When an agent receives a message from another agent to attempt to interpret and input string, it compares the input string to each of the agent's policy conditions in sequence. If a condition does apply to the input string, or to part of the input string, then the policy makes a "claim" on the applicable portion of the input string, and returns the claim to the agent that requested the interpretation. A claim identifies (among other things) the agent and policy which is making the claim, and the portion of the input string to which the claim applies (called the claim "focus"), and also (in various embodiments) may indicate the priority number of the agent or policy, and also a confidence level which indicates how well the input matches the policy condition. The priority and confidence levels, and the focus, all can be used subsequently by upchain agents for comparison with other claims made by other downchain agents, so as to permit the upchain agent to select a "best" one among competing claims.

There are three categories of policy conditions: terminal conditions, unary conditions and binary conditions. Terminal conditions are used to create claims by matching specific tokens (tokens in string literals or in datasources such as text files or database columns). Unary conditions are used to reference or filter claims created by terminal conditions, other policy conditions or other agents. Binary conditions are used to create a new claim by joining two or more claims made by a terminal condition, unary condition or other binary conditions. Policy conditions are written as expressions made up from operators and operands. The operands on which an operator can act include tokens (words, strings, numbers, symbols, delimiters), text files (which can contain their own policy conditions), databases, and claims made by other policies. If a first policy condition (the "referencing policy condition") refers to a second policy (the "referenced policy") previously evaluated in the same agent, then any claim made by the referenced policy can be figured into the evaluation of the referencing policy condition in the manner specified by the operators. If a policy condition refers to another agent (the "referenced agent") downchain of the current agent (the "referring agent"), then the claim or claims returned by the referenced downchain agent are figured into the evaluation of the referencing policy condition in the manner specified by the operators. Note that a policy condition that references a downchain agent cannot be completely resolved until the input string is passed to that other agent for comparing to its own policy conditions. In one embodiment, the referencing agent passes the input string to each downchain agent only upon encountering the agent's name while evaluating a policy condition. In the present embodiment, however, the referencing agent passes the input string to all downchain agents mentioned in any policy condition in the referencing agent, before the referencing agent begins evaluating even its first policy condition.

As used herein, a second agent is "downchain" from a first agent if the first agent contains an interpretation policy that depends on claims made by the second agent. A "child" of a particular node is immediately downchain of that node, but grandchild nodes, great grandchild nodes, etc., are all considered herein to be "downchain" of the particular node. In a network with cyclical relationships, one node can be downchain of itself. In the present embodiment, a second agent is defined as being immediately downchain from a first agent if the second agent is referenced in the first agent's policy conditions. Note that a "relationship" agent, described below, merely allows a downchain object agent to play as a field in an upchain object agent. As such, a second object agent that is immediately downchain of a first object agent except for an intervening relationship agent, is still considered to be "immediately" downchain from the first object agent.

In FIG. 2, the interaction agent 110 initiates an interpretation attempt into the interpretation network 114 by communicating the input document, in an object of class "InitiateInterpretationMessage", to the Top agent of the network 114. In the network of FIG. 2, the Top agent is Interpretation agent 212. The Top agent contains one or more interpretation policies whose policy conditions, in a typical network, do very little aside from referencing one or more other agents deeper in the network. Interpretation agent 212, for example, contains a single interpretation policy whose policy condition does nothing more than reference the System agent 214. Such a policy condition applies to the input token string if and only if the System agent can make a claim to at least part of the input token string. When Interpretation agent 212 encounters this policy condition, therefore, it forwards the input token string to the System agent 214 in an object of class "IntepretItMessage". The System agent 214 is thus considered to be "downchain" of the Interpretation agent 212, and the Interpretation agent 212 is considered to be "upchain" of the System agent 214.

When the System agent 214 receives the input token sequence, it first looks in its policies for policy conditions that make reference to further agents downchain of the System agent 214. If there are any, then the System agent 214 forwards the input token string to each of the further downchain agents in an "IntepretItMessage" and awaits replies. In the embodiment of FIG. 2, the Reply, Forward, Schedule and Find agents 216, 218, 220 and 222, respectively, are all referenced in the System Agent's policy conditions and are therefore downchain of the System Agent 214. Each agent downchain of the System agent 214 does the same upon receipt of an InterpretItMessage. When an agent has received all replies (or in certain embodiments, times out on all replies not yet received), the agent tests the input token sequence against the agent's policy conditions. The agent processes the input in order from the agent's first policy to its last policy. Each policy makes all the claims it can on the input. Subsequent policies in the agent can make reference to claims made by previously processed policies in the agent, as well as to claims made by downchain agents. After all policies have made their claims the agent uses a predetermined algorithm to select the "best" claim. If the best claim is one made from a specific operator (e.g. combo operator), then the sub-claims are also selected. The agent then returns the selected claim or claims to the agent's upchain agent in an object of class ClaimMessage. If the agent is not able to make any claims on the input, then the agent passes upchain an object of class NoClaimMessage.

Thus in the embodiment of FIG. 2, the System agent 214 eventually will receive any claims made by its downchain agents and will refer to such claims in the evaluation of its own policy conditions. The System agent 214 then will respond to the Interpretation agent 212 with either a ClaimMessage or a NoClaimMessage. If the Interpretation agent 212 receives a NoClaimMessage, then the Interpretation agent's single policy does not apply. A null actuation message will still be sent to the actuation agent 112, but no command will be sent to the back-end application. If the Interpretation agent 212 receives a ClaimMessage, then the Interpretation agent's policy does apply.

The Interpretation agent 212 evaluates its own policy conditions in the same manner as other agents in the network, and each such policy again makes as many claims as it can on the input. But because the Interpretation agent 212 is the Top agent, it does not transmit any resulting claims (or NoClaims) to any further upchain agents. Instead, as the Top agent of a network, after selecting one or more "best" claim(s) in the manner described above, Interpretation agent 212 has the responsibility to delegate "actuation" to the agents and policies that made up the claim(s). This process, which is sometimes called "executing" the winning claim, takes place according to the "action" part of the winning policy or policies in the Top agent. The action part of a policy builds up an actuation object. The actuation object is typically an instantiation of a Java class built up by setting values for different fields in an instantiation of a Java class, which as previously mentioned can be converted into an XML string. The XML version is set forth herein for simplicity of illustration. The build up of the actuation object is in a manner similar to that in which policy conditions build up the result of the condition, that is, by operators and operands that can include words, numbers, symbols, actuation objects already created by other policies within the same agent, and actuation objects created by other downchain agents. Typically the downchain agents referred to in the action part of a policy are the same agents referred to in the condition part of the policy.

In order to fill in the actuation sub-strings defined by downchain agents, the Top agent sends an object of class DelegationMessage to each downchain agent referenced in the action part of the winning policy(ies). In the embodiment of FIG. 2, the Interpretation agent 212 contains only one policy, the action part of which does nothing more than delegate to the System agent 214. The actuation returned by the System agent 214 therefore will be the actuation object output of the network. The DelegationMessage received by an agent includes a reference to the particular policy or policies of that agent which formed part of the winning claim. Upon receipt of such a message, therefore, the agent executes the action part of each of its policies that formed part of the winning claim, issuing DelegationMessages of its own to its own downchain neighbors as called for in the action part of the such policies, and building up an actuation for returning to the agent's upchain caller. Actuations are passed to upchain agents in objects of class ActuationMessage, ultimately once again reaching the Top agent of the network (Interpretation agent 212). This agent in the present embodiment returns the actuation message to the Process method of Actuation agent 112. The actuation message contains the user's intent, as interpreted by the interpretation network 114, and can be converted by the actuation agent 112 into appropriate commands in the format required by the back-end application.

Thus it can be seen that interpretation of the user's intent takes place in an agent network in a distributed manner. Each of the agents in interpretation network 114 can be thought of as having a view of its own domain of responsibility, as defined by its interpretation policies. Typically the application domain is organized by the designer into a hierarchy of semantic sub-domains, and individual agents are defined for each node in the semantic hierarchy. In the embodiment of FIG. 2, for example, the System agent 214 is responsible for all semantics that relate to personal information management (i.e., all queries in the entire application domain in this example). The Reply agent 216 is responsible for detecting and acting upon parts of user queries that indicate a desire to reply to something, and the Forward agent 218 is responsible for detecting and acting upon parts of user queries that indicate a desire to forward something. Schedule agent 220 is responsible for detecting and acting upon parts of user queries that that indicate a desire to schedule something (such as appointments), and the Find agent 222 is responsible for detecting and acting upon parts of user queries that indicate a desire to find something. Find agent 222 has downchain thereof an InboxMessage agent 224, a Date_time agent 226, an Appointment agent 228 and a Contact agent 230. The InboxMessage agent 224 is also downchain from the Reply and Forward agents 216 and 218, and the Appointment agent 228 is also downchain of the Schedule agent. Further agent names and relationships are apparent from the drawing.

It can also be seen that the Top agent of a network is responsible for receiving input and initiating queries into the network, and the agents representing the fields of the objects in the system (the agents constructing their actuation without reference to further agents) are the lowest order nodes (leaf agents) of the network. The network operates in two main phases: the interpretation phase and the delegation phase. In the interpretation phase, an initiator agent (such as the Top agent) receives the input token sequence and, by following its policy conditions, queries its downchain agents whether the queried agent considers the input token sequence, or part of it, to be in its domain of responsibility. Each queried agent recursively determines whether it has an interpretation policy of its own that applies to the input token sequence, if necessary further querying its own further downchain agents in order to evaluate its policy conditions. The further agents eventually respond to such further queries, thereby allowing the first-queried agents to respond to the initiator agent. The recursive invocation of this procedure ultimately determines a path, or a set of paths, through the network from the initiator agent to one or more leaf agents. The path is defined by the claim(s) ultimately made by the initiator agent. After the appropriate paths through the network are determined, in the delegation phase, delegation messages are then transmitted down each determined path, in accordance with the action parts of winning policies, with each agent along the way taking any local action thereon and filling in with further action taken by the agents further down in the path. The local action involves building up segments of the actuation string, with each agent providing the word(s) or token(s) that its policies now know, by virtue of being in the delegation path, represent a proper interpretation of at least part of the user's intent. The resulting actuation string built up by the selected agents in the network are returned to the initiator agent as the output of the network. This actuation string contains the fields and field designators required to issue a command or query to the back-end application, to effect the intent of the user as expressed in the input token string and interpreted by the interpretation network 114. Note that the transmission of a delegation message to a particular agent is considered herein to "delegate actuation" to the particular agent, even if the particular agent effects the actuation merely by forwarding the delegation message to one or more further agents.

Although not required for all implementations, in the embodiment of FIG. 2, agents in the agent network are organized in three levels: commands, objects and fields. Command agents, identified in the drawing by the designation 'C', contain policies designed to recognize a particular command (action request) in the user input. Object agents, identified in the drawing by the designation 'O', contain policies designed to recognize an object on which the user desires an action to take place. Field agents, identified in the drawing by the designation 'F', contain policies designed to recognize particular object fields on which the user wishes the action to take place. Thus in the network of FIG. 2, four commands will be recognized: Reply, Forward, Schedule and Find. The diagram shows only one object agent (InboxMessage agent 224) downchain from each of the Reply and Forward agents 216 and 218, respectively, so in the simplistic network of FIG. 2 the only kind of object that the system will recognize as being the object of a user's reply or forward command is an inbox message. The field agents downchain of the InboxMessage agent 224 are omitted from FIG. 2 for simplicity of the illustration.

Similarly, the only object downchain of the schedule agent 220 is the appointment agent 228, which is also downchain from the Find agent 222. The Appointment agent 228 has two downchain field agents, namely the ApointmentTitle agent 232 and the AppointmentBody agent 234. However, in the embodiment of FIG. 2, a network can essentially incorporate another object agent as if it were a field agent by connecting the downchain object agent via a Relationship agent (identified in FIG. 2 by the designation 'R'). In FIG. 2, the Date_time agent 226, which is one of the object agents immediately downchain of the Find agent 222, is also downchain of the Appointment agent 228 via a relationship agent 236 (AppointmentDate). Object agents can be chained together to any depth in the embodiment of FIG. 2, as indicated by the PhoneNumbers object agent 238, which is downchain of the Contact agent 230 via a ContactPhone relationship agent 240, the Contact agent 230 itself being downchain of the Appointment object agent 228 via a Participants relationship agent 242.

In general, the interpretation agents can be thought of as being disposed in "levels". At the top is a "root node", the System agent 214 in the embodiment of FIG. 2. As used herein, a "root node" is merely a place from which to start a path into the network. The root node need not have all the characteristics of an interpretation agent. In some embodiments, the root node might be implied rather than explicit. All of the command agents are then disposed in "level 1", since they are all immediately downchain from a root node. A "level 2" then contains only object agents, all of which are immediately downchain from one or more of the command agents in level 1. In FIG. 2, the InboxMessage agent 224, the Appointment agent 228 and the Date_time agent 226 are all in level 2. Level 3 contains field agents, all of which are immediately downchain of object agents in level 2. Level 2 also contains, via relationship agents, additional object agents.

The agent network is designed so as to make sense semantically in the context of the particular back-end application. In particular, a first domain is said to have a "semantic relationship" with a second domain in the agent network hierarchy if it is meaningful in the context of supported applications for user input to juxtapose the first domain with the second domain in user input. Where domains are categorized, for example into command, object and field domains, a first domain in a first category is said to have a semantic relationship with a second domain in the second category if it is meaningful in the context of supported applications for user input to juxtapose the first domain with the second domain in user input, each performing the semantic function in the user input of the semantic category containing the respective domain. In the context of a personal information manager, for example, a semantic hierarchy might include commands in the first category, objects in a second and fields in a third. Thus user input such as "schedule appointment with John" might be interpreted to include the "schedule" domain in the command category, the "appointment" domain in the objects category, and a "contact" domain in the fields category. The "schedule" domain has a semantic relationship with the "appointment" domain because it is meaningful in the context of the personal information manager for a user to request the scheduling of an appointment, and the "contact" domain has a semantic relationship with the "appointment" domain because it is meaningful for an appointment to have a participant field defined by an entry in a contacts database. An "inbox message" domain does not have a semantic relationship with the "schedule" domain because, at least in the context of the back-end application for FIG. 2, it is not meaningful for a user to want to schedule an inbox message.

In operation, when the network of FIG. 2 receives user input for interpretation, it develops an interpretation and returns it in an object of class ClaimMessage. The ClaimMessage identifies all the agents that contributed to the final claim. For user input such as, "Find meeting today with John", the winning claim identifies the following agents: the Find command agent 222, the Appointment object agent 228, the Date_time object agent 226 (via the AppointmentDate relationship agent 236), the Contact object agent 230 (through the Participants relationship agent 242), the Name object agent 244 (through the ContactName relationship agent 248), and the FirstName field agent 246. The claim therefore identifies two "paths" through the agent network:

1. Find→Appointment→Date_time

2. Find→Appointment→Contact→ContactName→Name→FirstName=John

The first interpretation path identifies a command-object-object sequence of agents, and the second interpretation path identifies a command-object-object-object-field sequence of agents. The two interpretation paths might be represented in an XML string such as the following:

```
<Interpretation>
  . . .
  <System type="intent">
    <Find type="command" explicit="true">
      <Appointment type="object" groups="personal info" explicit="true">
        <AppointmentDate type="relation">
          <date_time type="object" explicit="true">
            <day><![ CDATA[ 22] ]></day>
            <month><![ CDATA[ 12] ]></month>
            <year><![ CDATA[ 2004] ]></year>
          </date_time>
        </AppointmentDate>
        <Participants type="relation">
          <Contact type="object" groups="personal info">
            <ContactName type="relation">
              <name type="object">
                <FirstName type="field"><![ CDATA[ john] ]></FirstName>
              </name>
            </ContactName>
          </Contact>
        </Participants>
      </Appointment>
    </Find>
  </System>
</Interpretation>
```

As used herein, a "path" through an agent network identifies a chain of agents in the network, each immediately downchain of a previous agent in the chain. A "path" can start anywhere in the network and can end anywhere, but must contain at least one agent. Paths are most easily thought of as having a direction, from upchain agent to downchain agent. In the embodiment of FIG. 2, interpretation paths always include a command agent; they cannot start with an object agent or a field agent. Though the two paths mentioned above share their first two agents (the Find and Appointment agents), branching off only after the Appointment agent, each "path", as that term is used herein, is still considered to start with the Find agent and include all the agents that are shared. Nevertheless, as can be seen from the above, the interpretation XML combines the two paths to the extent of initial agents that are shared. Also, although the paths recorded in the present embodiment include any intervening relationship agents explicitly, it will be appreciated that in another embodiment the relationship agents can be omitted.

Thus interpretation paths either include only a command agent, or only a command and one or more object agents, or they can include a command agent, one or more object agents, and a field agent. Note that this is true as long as the network is able to make any interpretation at all from the user input, even if the user input explicitly states only objects and fields. In the case of user input without a command, the network is often able to imply the command from the recent history of user interaction or from other context information. And even if it cannot imply the command from history or other context, it can still imply the command since the policy conditions in network are designed such that one command agent is able to make a claim based solely on claims made by its downchain agents. The "implicit match" capability is assigned to an agent by means of an agent property. In some agent networks more than one command agent is given the ability to make implicit claims, in which case the root agent chooses among the claims made by the different command agents using its normal ranking mechanism. In other networks no command agent is given the ability to make implicit matches, in which case the network will not make any claims on user input that omits an explicit or implicit command. Preferably, however, exactly one command agent is given this ability, and preferably it is the Find agent (or another similar agent) because no harm can occur if a "find" command is implied incorrectly.

Actuation Agent

Figure 3:
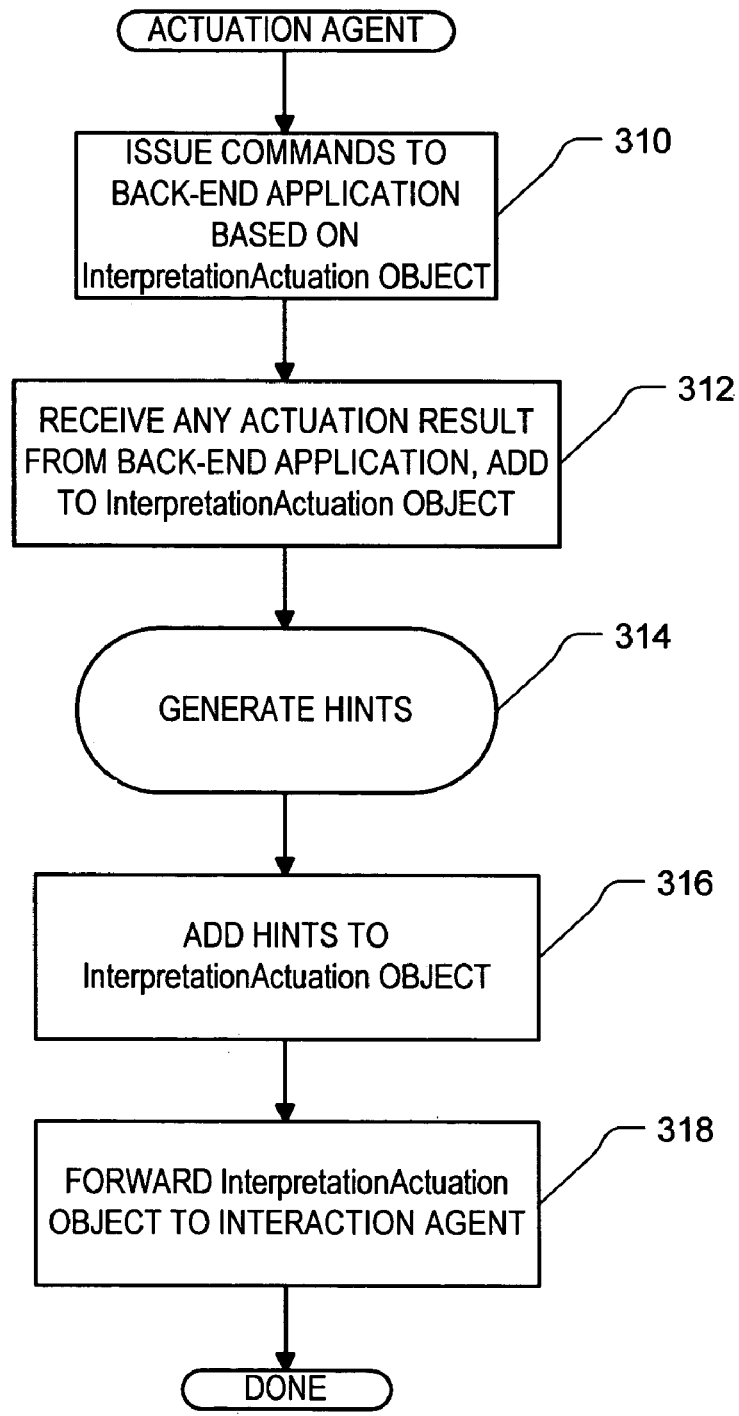
FIG. 3 is a flowchart of steps that take place in the actuation agent of FIG. 1.

FIG. 3 is a flowchart of pertinent steps that take place in the actuation agent 112 in response to receipt of an actuation message from the interpretation network 114. As with all flow charts herein, it will be appreciated that many of the steps of FIG. 3 can be combined, performed in parallel or performed in a different sequence without affecting the functions achieved. In a step 310, the actuation agent 112 first converts the actuation string from its incoming format to whatever format and command sequence is required by the back-end application to effectuate the intent of the user. The commands are forwarded to the back-end application by whatever transport mechanism is in use. In an embodiment, the actuation agent 112 performs these steps using the techniques described in U.S. patent application Ser. No. 10/327,440, filed 20 Dec. 2002, entitled "ACTUATION SYSTEM FOR AN AGENT ORIENTED ARCHITECTURE", the entirety of which is incorporated herein by reference. Note that the actuation system can issue commands to more than one back-end application, as indicated by the user's intent.

In step 312, the actuation agent 112 receives any response from the back-end application, and uses it to create an "interaction" string for transmission toward the user. This string is referred to herein as an interaction string rather than a response, because it can often request further input from the user. The interaction string is added to an InterpretationActuation object that also contains the interpretation and the actuation string from the network 114.

In step 314, the actuation agent 112 generates any hints based on the interpretation from the interpretation network 114. In step 316 it adds the list of hints to the Interpretation-Actuation object, and in step 318 it forwards the resulting object to the interaction agent 110 for output toward the user.

Figure 4:
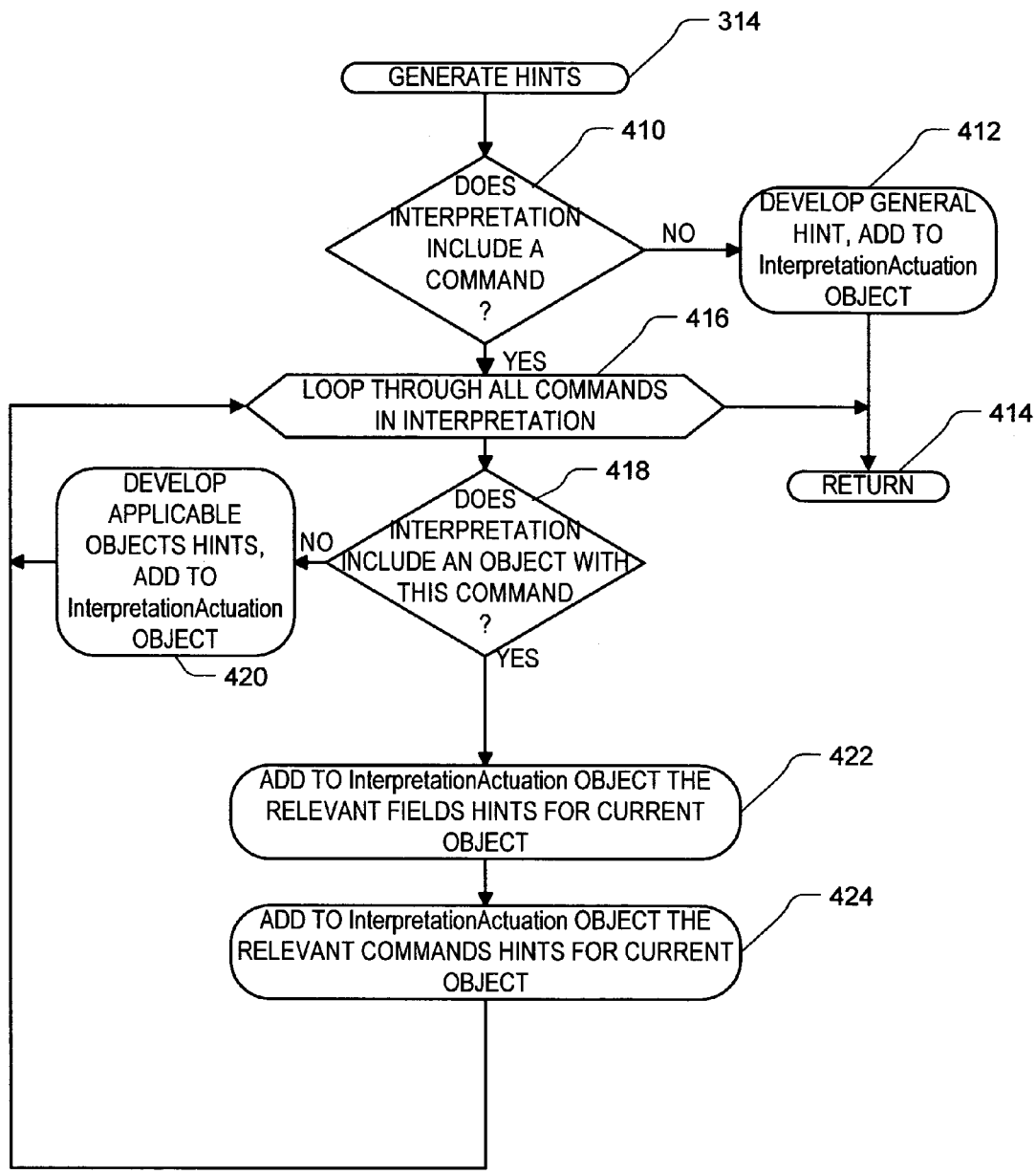
FIG. 4 is a flowchart detail of the step in FIG. 3 for generating hints.

FIG. 4 is a flow chart of the step 314 in FIG. 3 in which the actuation agent 112 generates hints. Hints are most valuable when they are based on the user's current context, and one excellent repository of current context information is the current interpretation from the network 114. In FIG. 4, the current interpretation is used to develop the hints.

As previously mentioned, an interpretation includes one or more claims, each of which define respective interpretation paths through the agent network 114. The paths capture different parts of the user input. They may overlap, but are not identical. Also as mentioned, each interpretation path in the present embodiment begins with a command agent. If the interpretation does not include a command agent, then no interpretation was made (the system was unable to understand any part of the user input). In step 410, therefore, the actuation agent 112 determines whether any command agents are included in the interpretation. If not, then in step 412, the system creates a "General Hint", generally offering all the commands available in the application. For example, if the user input is "What can you do", no command agent in the network of FIG. 2 will make a claim. The following general hint will therefore be created:

Commands: Reply, Forward, Schedule, Find.

This hint might be presented to the user (by the interaction agent 110) in prose, such as:

"You can reply, forward, schedule or find an object."

The hint might be represented in XML by a string such as:
<Interpretation info="No interpretation. Keeping context.">
. . .
<Hints>
  <Hint purpose="generalHint">
    <Commands> <Reply /> <Forward /> <Schedule /> <Find /></Commands>
  </Hint>
</Hints>
</Interpretation>

The General Hint is added to the InterpretationActuation object and the routine terminates in step 414.

If in step 410 the interpretation is determined to include at least one command agent, then in step 416, the actuation agent 112 begins a loop through all the command agents identified in the interpretation. Since no command agent in network 114 is downchain of any other command agent, each command agent traversed in the looping step 416 begins a different one of the interpretation paths contained in the interpretation. The network might form two interpretation paths with different command agents from user input such as, "Find and forward my emails". Separate hints will be developed for each interpretation path identified in the interpretation.

In step 418, for the current command agent in the interpretation, the actuation agent 112 determines whether the interpretation path identifies any object agents. If not (i.e. the system was able to recognize only the user's command, and not any objects on which the command should operate), then in step 420 the actuation agent 112 develops "Applicable Objects" hints and adds these to the InterpretationActuation Object. An Applicable Objects hint offers to the user all objects to which the user's command can be applied, and is determined simply from all the object agents that are immediately downchain from the current command agent in the network 114. For the input "find", for example, the following hint is generated from the agent network of FIG. 2:

Command Find→Objects: InboxMessage, Appointment, Date_time.

This hint might be presented to the user (by the interaction agent 110) in prose, such as:

"Do you want to find an InboxMessage, an Appointment, or a Date?"

The hint might be represented in XML by a string such as:
```
<Interpretation>
...
<Hints>
   <Hint purpose="applicableObjects">
      <Find>
         <InboxMessage />
         <Appointment />
         <Date_time />
      </Find>
   </Hint>
</Hints>
</Interpretation>
```

The Applicable Objects hint is added to the InterpretationActuation object and the routine returns to looping step 416 to determine whether the interpretation identifies any object agents downchain from the next command in the interpretation. Note that the hint described above includes not only the object alternatives available to the user, but the entire path leading to each object alternative. That is, the hint includes the Find agent, in addition to the options for object agents. Thus the hint actually identifies an alternative path through the agent network, different in some way from the interpretation path from which it was generated.

If in step 418 it is determined that the interpretation does identify an object agent with the current command agent, then two additional kinds of hints are developed. In step 422 the actuation agent 112 develops "Relevant Fields" hints and adds them to the InterpretationActuation object, and in step 424 it develops "Relevant Commands" hints and adds them as well to the InterpretationActuation object. Both kinds of hints are described in more detail below. After all hints for the current command have been added to the InterpretationActuation object, the routine returns to looping step 416 to develop hints for the next command identified in the interpretation.

Figure 5:
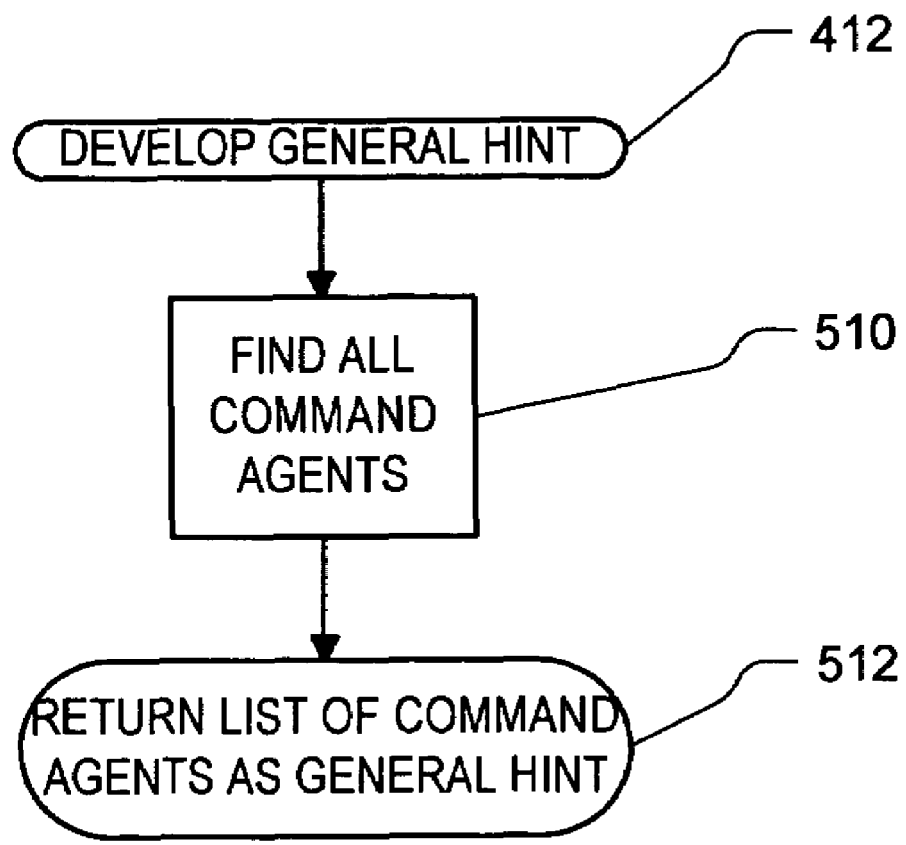
FIG. 5 is a flowchart detail of the step in FIG. 4 for developing the General Hint.

FIG. 5 is a flowchart detail of the step 412 in FIG. 4 for developing the General Hint. The General Hint as previously mentioned is merely a list of all commands available in the system, and because of the organization of the network of FIG. 2, the actuation agent 112 can determine this merely by finding all the agents immediately downchain in the network from the root agent of the network. In step 510, therefore, the actuation agent 112 finds all agents immediately downchain from the System agent 214. In step 512, it returns the list of such agents for use in constructing the General Hint.

Figure 6:
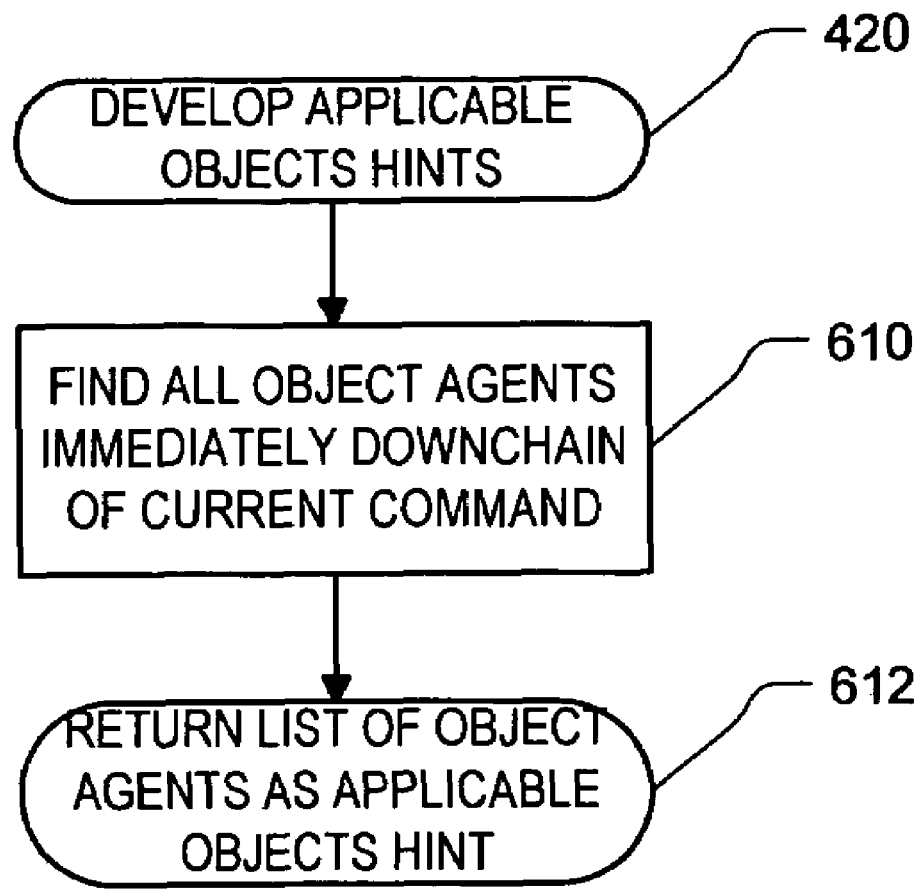
FIG. 6 is a flowchart detail of the step in FIG. 4 for developing Applicable Objects hints.

FIG. 6 is a flowchart detail of the step 420 in FIG. 4 for developing the Applicable Objects hints. The Applicable Objects hints as previously mentioned offer to the user all the objects on which the user's command can act. Again, because of the organization of the network of FIG. 2, the actuation agent 112 can determine this merely by finding all the agents immediately downchain in the network from the current command agent. All such agents will be object agents, and all will have a semantic relationship with the current command, meaning it will make sense in the context of the back-end application to request that the current command be applied to any of such objects. In step 610, therefore, the actuation agent 112 finds all agents immediately downchain in the network of FIG. 2 from the current command agent. In step 612, it returns the list of such agents for use in constructing the Applicable Objects hint.

Figure 7:
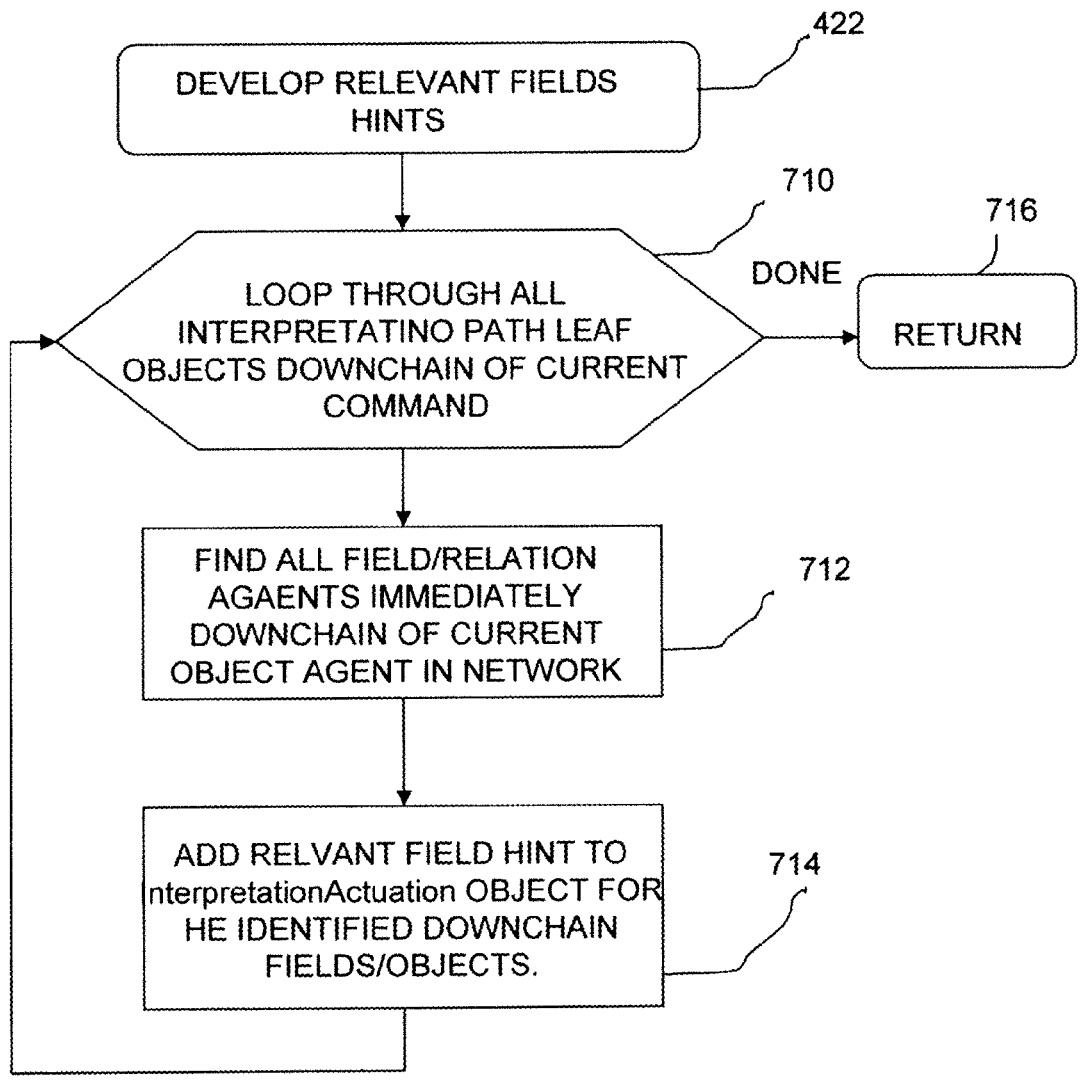
FIG. 7 is a flowchart detail of the step in FIG. 4 for developing Relevant Fields hints.

FIG. 7 is a flowchart detail of the step 422 in FIG. 4 for developing Relevant Fields hints. The Relevant Fields hint is offered separately for each object identified in the interpretation, when the user does not provide values for all fields of the object. The Relevant Fields hint can help the user learn about the other fields in the object (which can also help the user narrow down the request). An example illustrating how a Relevant Fields hint might be used in user interaction is as follows:

User: "Find contact john"
System: "Found 10 contacts with first name john."
<list of matches found with links to details>
"Hint: You can use contact's employer, last name or phone to narrow down your request."

For the user input, "Find meeting today with John", interpretation is set forth above. The following object agents are identified: Appointment, Date_time, Contact, contact:Name. The user filled in the Date_time and Contact "fields" of the Appointment object, but did not fill in the appointment address, body or title. Relevant Fields hints will therefore be generated to inform the user that appointment Date_time, Contact, Address, Body and Title fields are available. (A different embodiment might omit the Date_time and Contact fields from this hint, since the user has already demonstrated familiarity with these fields.) For the Date_time object, the user filled in Day, Month and Year values but did not provide a value for appointment Time. Relevant Fields hints will therefore be generated to inform the user that Day, Month, Year and Time fields are all available. (Again, a different embodiment might omit the Day, Month and Year fields.) For the Contact object, the user filled in the contact:Name field but not the Employer field or ContactPhone field. Relevant Fields hints will therefore be generated to inform the user that contact:Name, Employer and ContactPhone fields are available. For the contactName object, the user filled in the FirstName field but not the LastName field. Relevant Fields hints will therefore be generated to inform the user that both FirstName and LastName fields are available. Assembling all these hints into an XML string, the following Relevant Fields hint is generated from the agent network of FIG. 2:

```
<Interpretation>
...
<Hints>
   <Hint purpose="relevantFields">
      <Find type="command" explicit="true">
         <Appointment type="object" groups="personal info" explicit="true">
            <AppointmentAddress type="relation" />
            <Body type="field" />
            <AppointmentDate type="relation">
               <date_time type="object" explicit="true">
                  <day />
                  <month />
                  <year />
                  <time />
               </date_time>
            </AppointmentDate>
            <Title type="field" />
            <Participants type="relation">
               <Contact type="object" groups="personal info">
                  <ContactName type="relation">
```

```
            <Name type="object">
              <FirstName type="field" />
              <LastName type="field" />
            </Name>
          </ContactName>
        </Contact>
        <Employer type="relation" />
        <ContactPhone type="relation" />
      </Contact>
    </Participants>
  </Appointment>
 </Find>
 </Hints>
</Interpretation>
```

Referring to FIG. 7, Relevant Fields hints are developed by first looping through all the interpretation path objects that are downchain of the current command (step 710). For each object, in step 712, the actuation agent 112 finds all field and relation agents that are immediately downchain of the current object agent in the agent network, and creates a hint from that list. In step 714 the actuation agent 112 adds the hint to the InterpretationActuation object based on the list, and the loop repeats for the next interpretation path object downchain of the current command. When all such interpretation path objects have been considered for Relevant Fields hints, the process returns (step 716). As for the Applicable Objects hints, the Relevant Fields hints can be thought of as alternative paths through the agent network, each different in some way from each other and from the interpretation path.

Figure 8:
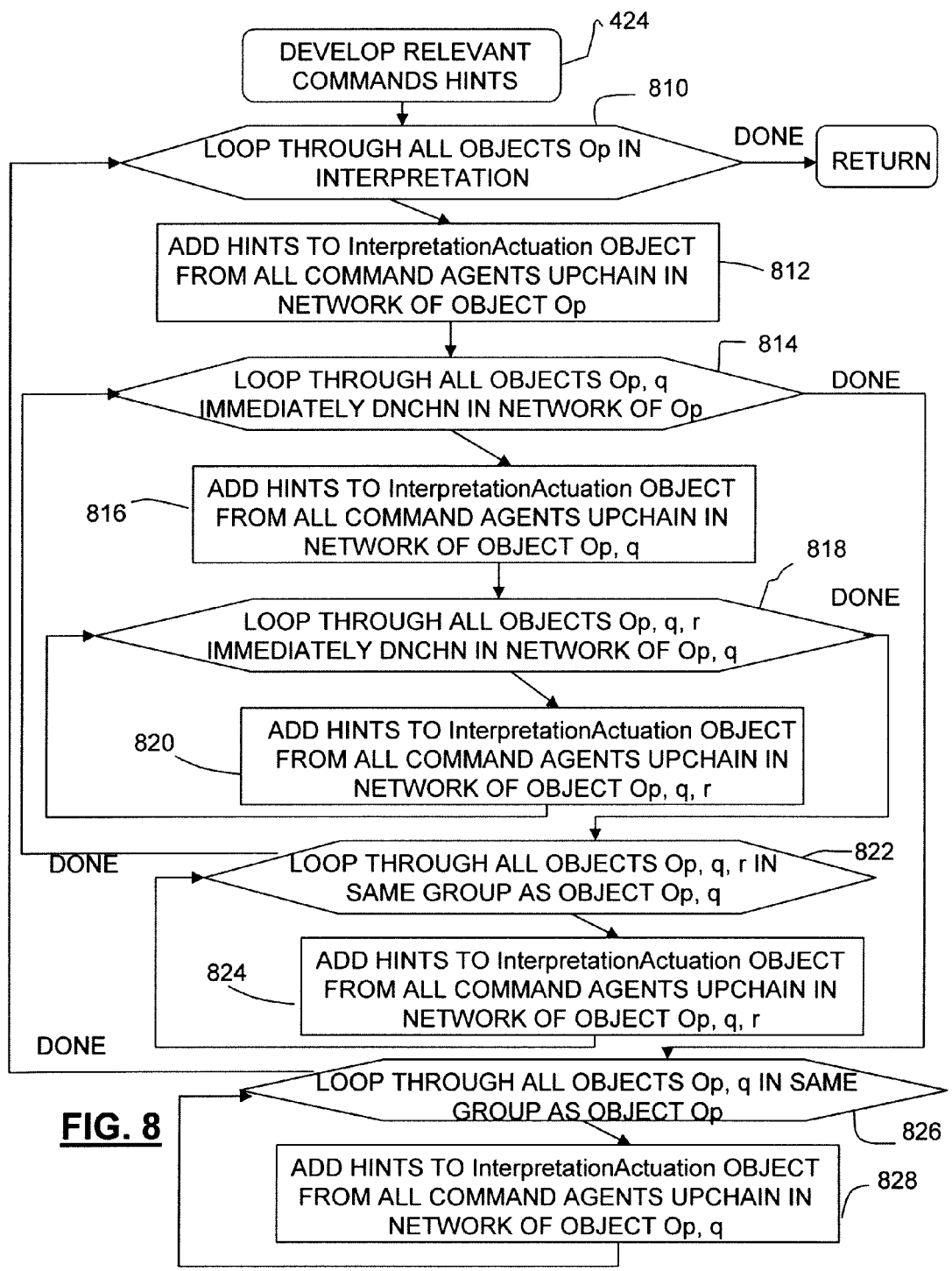
FIG. 8 is a flowchart detail of the step in FIG. 4 for developing Relevant Commands hints.

FIG. 8 is a flowchart detail of the step 424 in FIG. 4 for developing Relevant Commands hints. This hint is given when the user requests a command on an object. This hint offers a list of all other commands that can be applied to that object, and all commands that can be applied to relevant objects. For example:

| User: | "Find meeting today with john" |
|---|---|
| System: | "Found appointment Dec. 22, 2004 with participant john smith:" |
| | <details of the appointment> |
| | "Hint: You can Schedule an Appointment with john smith. You can Find Contact john smith. You can also Find objects with Date Dec. 22, 2004 or Find Appointments with Date Dec. 22, 2004, Schedule an Appointment with Date Dec. 22, 2004. You can also Find, Reply to or Forward InboxMessages from john smith." |

Note that in the above example Appointment and InboxMessages are objects relevant to the Contact object, as Contact plays as a field for both. Thus the Relevant Commands hints include not only other commands applicable to a user-specified object, but also commands applicable to other objects that are "relevant to" a user-specified object. Various embodiments can have their own definitions for what objects are "relevant to" an object included in the interpretation, but preferably at least one method for finding "relevant" objects takes advantage of the semantic relationships embodied in the agent network.

The algorithm for developing Relevant Commands hints is performed separately beginning with each object included in the interpretation and downchain of the current Command agent. The algorithm also develops hints beginning with objects related in the network by a "distance=1" from the current object, objects related in the network by a "distance=2" from the current object, and could be extended to develop hints beginning with objects related in the network by greater distances from the current object. The greater the distance from an object included in the interpretation, the less contextually relevant the resulting hints are likely to be. It can be seen that a recursive algorithm can be an effective design for the Relevant Commands hints algorithm.

For simplicity of illustration, however, the embodiment of FIG. 8 is limited to a distance=1, and uses nested loops rather than recursion. In step 810, the actuation agent 112 begins a loop through all object agents included in the interpretation. The current object is denoted Op. In step 812, the actuation agent 112 develops hints from all command agents that are immediately upchain in the agent network from object agents Op. Because of the semantic relationships among the agents in the network, these commands will likely be the most relevant as follow-up in the current context of the user interaction. These hints are added to the InterpretationActuation object as Relevant Commands hints.

Figure 2A:
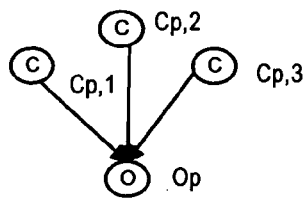
FIGS. 2A-2D illustrates the alternative paths developed during the hints generation method.

FIG. 2A illustrates the alternative paths developed in this step. For each Object agent Op included in the interpretation, hints are created from each immediately upchain Command agent Cp,q. FIG. 2A shows three upchain command agents Cp,1, Cp,2 and Cp,3. Thus the following hints (alternative paths) are created in this step:

Cp,1→Op
Cp,2→Op
Cp,3→Op

In each case, if the interpretation includes values for any fields of Op, they are also included in the hint. If an object downchain of Op plays as a field for object Op, then any values for the fields of the downchain object are included in the hint, and so on. Thus for the input "Find meeting today with john", using the agent network of FIG. 2, the following object agents are included in the interpretation: Appointment agent 228, Date_time agent 226, Contact agent 230, and Name agent 244. Appointment agent 228 has two upchain command agents, Schedule agent 220 and Find agent 222. Thus the following two hints are created in step 810:

Schedule→Appointment→Contact→ContactName→FirstName=John
Find→Appointment→Contact→ContactName→FirstName=John The Date_time agent 226 has only the Find command agent 222 upchain, so the following hint is created:

Find→Date_time→DMY=22-Dec-2004.

The Contact agent 230 similarly has only the Find command agent 222 upchain, so the following hint is created:

Find→Contact→ContactName→FirstName=John

The following XML string might be created to encapsulate all the hints created in step 810:

```
<Interpretation>
  ...
  <Hints>
    <Hint purpose="relevantFields">
      <Find type="command" explicit="true">
        <Appointment type="object" groups="personal info" explicit="true">
          <AppointmentAddress type="relation" / >
          <Body type="field" />
          <AppointmentDate type="relation">
            <date_time type="object" explicit="true">
              <day />
              <month />
              <year />
              <time />
            </date_time>
          </AppointmentDate>
          <Title type="field" / >
```

-continued

```
      <Participants type="relation">
        <Contact type="object" groups="personal info">
          <ContactName type="relation">
            <Name type="object">
              <FirstName type="field" />
              <LastName type="field" />
            </Name>
          </ContactName>
          <Employer type="relation" />
          <ContactPhone type="relation" />
        </Contact>
      </Participants>
    </Appointment>
  </Find>
</Hint>
<Hint purpose="relevantCommands">
  <Command>
    <Find type="command" explicit="true">
      <Appointment type="object" groups="personal info"
          explicit="true" / >
    </Find>
  </Command>
  <RelevantActions>
    <Find type="command">
      <Appointment type="object" groups="personal info"
          explicit="true" />
    </Find>
    <Schedule type="command">
      <Appointment type="object" groups="personal info"
          explicit="true" / >
    </Schedule>
  </RelevantActions>
</Hint>
    ...
  </Hints>
</Interpretation>
```

After hints are developed from commands applicable to the current interpretation Object agent Op in step 812 (i.e. hints applicable to object agents at a distance=0 in the network from Object agent Op), hints are next developed from commands applicable to Object agents that are immediately downchain from the current Object agent Op. These Object agents are at a distance=1 from an object agent included in the interpretation. Thus in step 814, the actuation agent 112 begins another loop, nested inside lop 810, through all objects that are immediately downchain from object Op in the network. Each of these downchain objects is denoted herein as object Op,q. In step 816, the actuation agent 112 adds hints to the InterpretationActuation object from all command agents immediately upchain in the network from object Op,q.

Figure 2B:
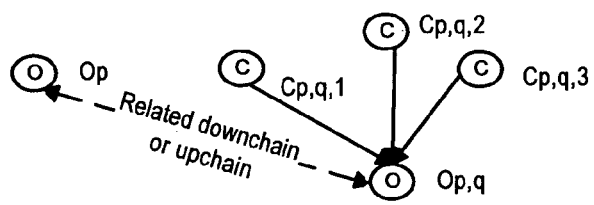

FIG. 2B illustrates the alternative paths developed in this step. For each Object agent Op,q that is immediately downchain from (or upchain to) an object Op included in the interpretation, hints are created from each immediately upchain Command agent Cp,q,r. FIG. 2B shows three upchain command agents Cp,q,1, Cp,q,2 and Cp,q,3. Thus the following hints (alternative paths) are created in this step:

Cp,q,1→Op,q
Cp,q,2→Op,q
Cp,q,3→Op,q

The object Op, to which object Op,q is related, is not part of the alternative path. Object Op,q may or may not be part of the original interpretation. If it is, however, and if the interpretation includes values for any fields of Op,q, they are also included in the hint.

For the input "Find meeting today with john", using the agent network of FIG. 2, the following object agents are distance=1 from Appointment agent 228: Date_Time agent 226, Contact agent 230, and Appointment Address agent 250. Of these, each of the Date_time agent 226 and the Contact agent 230 have one immediately upchain command agent, in both cases the Find command agent 222. The Appointment Address agent 250 does not have any immediately upchain command agents. Thus for Op=Appointment agent 228, the following two distance=1 hints are created in step 816:

Find→Date_time→DMY=22-Dec-2004
Find→Contact→ContactName→FirstName=John.

Similarly, the following object agents are distance=1 from Contact agent 230: Company agent 252, Contact Name agent 244 and Contact Phone numbers agent 238. None of these object agents have any immediately upchain command agents in the simplified network of FIG. 2, however, so no distance=1 hints are generated for object agent Op,q=Contact agent 230.

The following XML string might be created to encapsulate all the hints created in step 816:

```
<Interpretation>
  ...
  <Hints>
    <Hint purpose="relevantCommands">
      ...
    <Hint purpose="relevantCommands">
      <RelevantActions>
        <Find type="command">
          <date_time type="object" explicit="true">
            <day><![ CDATA[ 22] ]></day>
            <month><![ CDATA[ 12] ]></month>
            <year><![ CDATA[ 2004] ]></year>
          </date_time>
        </Find>
      </RelevantActions>
    </Hint>
    ...
    <Hint purpose="relevantCommands">
      <RelevantActions>
        <Find type=command">
          <Contact type="object" groups="personal info>
            <ContactName type="relation">
              <name type="object">
                <FirstName type="field"><![ CDATA[ john] ]></FirstName>
              </name>
            </ContactName>
          </Contact>
        </Find>
      </RelevantActions>
    </Hint>
  </Hint>
    ...
  </Hints>
</Interpretation>
```

After hints are developed in step 816 from commands applicable to the current object Op,q, at distance=1 from the current interpretation object agent Op, hints are next developed from commands applicable to Object agents that are immediately upchain from the current distance=1 object agent Op,q. These object agents are at a distance=2 from an object agent included in the interpretation. Thus in step 818, the actuation agent 112 begins yet another loop, nested inside both loops 810 and 814, through all objects that are immediately upchain from object Op,q in the network. Each of these upchain objects is denoted herein as object Op,q,r. In step 820, the actuation agent 112 adds hints to the InterpretationActuation object from all command agents immediately upchain in the network from object Op,q,r.

Figure 2C:
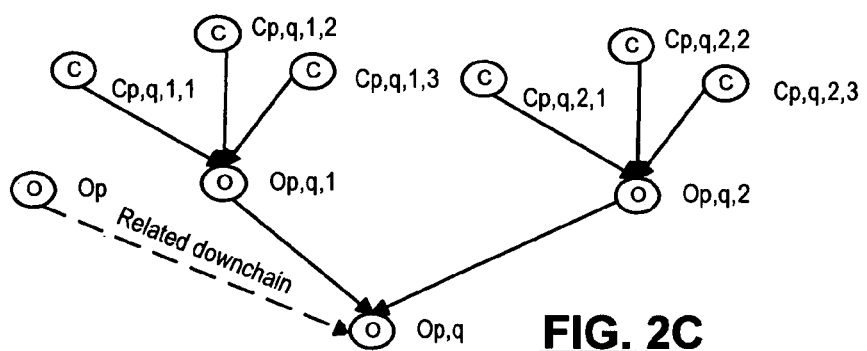

FIG. 2C illustrates the alternative paths developed in this step. For each Object agent Op,q,r that is immediately upchain from an object Op,q, which itself is immediately downchain from an object Op included in the interpretation, hints are created from each immediately upchain Command agent Cp,q,r,s. FIG. 2C shows two of the distance=2 object agents Op,q,1 and Op,q,2, three command agents Cp,q,1,1, Cp,q,1,2 and Cp,q,1,3 immediately upchain of object agent Op,q,1, and three command agents Cp,q,2,1, Cp,q,2,2 and Cp,q,2,3 immediately upchain of object agent Op,q,2. Thus the following hints (alternative paths) are created in this step:

Cp,q,1,1→Op,q,1→Op,q
Cp,q,1,2→Op,q,1→Op,q
Cp,q,1,3→Op,q,1→Op,q
Cp,q,2,1→Op,q,2→Op,q
Cp,q,2,2→Op,q,2→Op,q
Cp,q,2,3→Op,q,2→Op,q

Again, if object Op,q is part of the original interpretation, and if the interpretation includes values for any fields of Op,q, they are also included in the hint.

For the input "Find meeting today with john", using the agent network of FIG. 2, the InboxMessage object agent 224 is distance=2 from the Appointment object agent 228. The InboxMessage object agent 224 is related via the distance=2 Contact object agent 230. The InboxMessage object agent 224 has the following immediately upchain command agents: Reply agent 216, Forward agent 218 and Find agent 222. Thus the following distance=2 hints are created in step 820:

Reply→InboxMessage→From→Contact→Contact Name→FirstName=John
Forward→InboxMessage→From→Contact→Contact Name→FirstName=John
Find→InboxMessage→From→Contact→Contact Name→FirstName=John.

Other distance=2 hints will be generated as well, based on other interpretation objects, other distance=1 objects and other distance=2 objects.

The following XML string might be created to encapsulate just the three hints identified above created in step 816:

```
<Interpretation>
  ...
  <Hints>
    <Hint purpose="relevantCommands">
      ...
      <Hint purpose="relevantCommands">
        <RelevantActions>
          <Find type="command" >
            <InboxMessage type="object" groups="personal info">
              <From type="relation" >
                <Contact type="object" groups="personal info" >
                  <ContactName type="relation">
                    <name type="object">
                      <FirstName type="field"><![ CDATA[ john] ]>
                      </FirstName>
                    </name>
                  </ContactName>
                </Contact>
              </From>
            </InboxMessage>
          </Find>
          <Forward type="command">
            <InboxMessage type="object" groups="personal info">
              <From type="relation" >
                <Contact type="object" groups="personal info" >
                  <ContactName type="relation">
                    <name type="object">
                      <FirstName type="field"><![ CDATA[ john] ]>
                      </FirstName>
                    </name>
                  </ContactName>
                </Contact>
              </From>
            </InboxMessage>
          </Forward>
          <Reply type="command">
            <InboxMessage type="object" groups="personal info">
              <From type="relation" >
                <Contact type="object" groups="personal info" >
                  <ContactName type="relation">
                    <name type="object">
                      <FirstName type="field"><![ CDATA[ john] ]>
                      </FirstName>
                    </name>
                  </ContactName>
                </Contact>
              </From>
            </InboxMessage>
          </Reply>
        </RelevantActions>
      </Hint>
      ...
  </Hints>
</Interpretation>
```

Note that algorithms for generating alternative paths through the network for the purpose of developing hints, may often duplicate other alternative paths or even one of the original interpretation paths. In one embodiment, the system will delete all duplicated paths. In another embodiment, the system will retain all duplicate paths, and the user interface may choose to either delete them or offer them in duplicate to the user. In yet another embodiment, the system retains some or all duplicate paths but tags or otherwise annotates them to indicate how they were generated. Again, the user interface may choose to offer some or all of the duplicate paths to the user, but using a layout or menu structure that organizes the hints intelligently based on how they were generated.

The hints developed in steps 812, 816 and 820 all take advantage of the semantic relationships inherent in the structure of the agent network of FIG. 2 in order to find relevant object agents, and hence relevant commands to offer as contextually relevant hints. But "relatedness" can also derive from sources outside the agent network. In the embodiment of FIG. 8, after hints are developed in steps 818 and 820, looping through all object agents Op,q,r immediately upchain in the network of object Op,q, in steps 822 and 824 hints are developed by looping through all object agents Op,q,r that have been pre-programmed by a designer as being in a common "group" with object agent Op,q. For example "bars" and "restaurants" can be categorized in the same group (e.g. entertainment) and therefore when user references one object the relevant commands for the relevant objects in the same group will also appear in the hints. In the network of FIG. 2, the Contact object agent 230, the Appointment object agent 228 and the InboxMessage object agent 224 are all pre-programmed to be within a "personal info" group. Group names are assigned to an agent by means of an agent property, and object agents can be assigned to more than one group or no group. Object agents that are related by means other than the agent network structure, are still considered to be related by a distance=1. Thus object agents that have a "same group" relation to an object agent immediately downchain from an object agent in the original interpretation, are still considered to be at a distance=2 from the object agent in the original interpretation.

In step 822, therefore, the actuation agent 112 begins still another loop, nested inside both loops 810 and 814 but not 818, through all objects share a common "groups" attribute as the object agent Op,q. Each of these objects is again denoted herein as object Op,q,r. In step 824, the actuation agent 112 adds hints to the InterpretationActuation object from all command agents immediately upchain in the network from object Op,q,r.

Figure 2D:
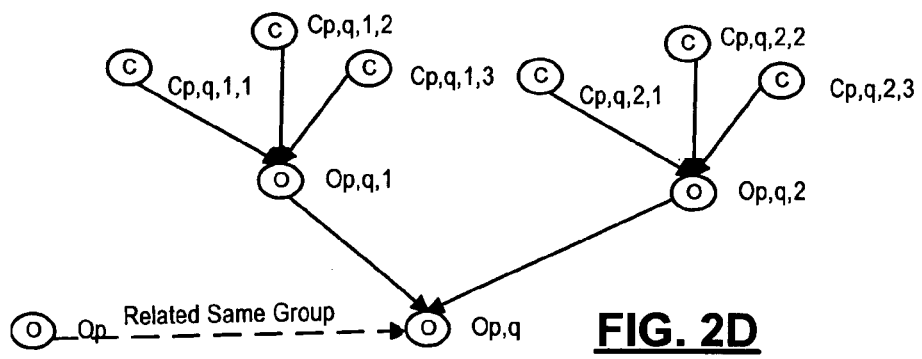

FIG. 2D illustrates the alternative paths developed in this step. They are similar to those developed in FIG. 2C, except that the starting object agent Op,q is related to interpretation object agent Op as sharing a common group, rather than as being downchain of object Op. The hints (alternative paths) constructed in this step will have a similar structure to those constructed in step 820.

After the "same group" hints are generated in steps 822 and 824, the actuation agent 112 returns to step 814 to create hints based on the next object agent Op,q immediately downchain from interpretation object agent Op. After all the hints have been created based on object agents immediately downchain from interpretation object agent Op, in steps 826 and 828 the actuation agent 112 develops hints based on the object agents that have a "same group" relationship with interpretation object agent Op. Thus in step 826, the actuation agent 112 begins yet another loop, nested inside loop 810 only, through all object agents sharing a common "groups" attribute with the object agent Op. Each of these objects is again denoted herein as object Op,q, and is considered herein to be a distance=1 from the object agent Op. In step 828, the actuation agent 112 adds hints to the InterpretationActuation object from all command agents immediately upchain in the network from object agent Op,q. Finally, after all hints have been generated based on interpretation object agent Op, the actuation agent 112 returns to step 810 to create hints based on the next object agent Op that was included in the original interpretation.

Returning to FIG. 4, after all hints have been generated for the interpretation paths that begin with the current command agent, the actuation agent 112 returns to step 416 to perform the same steps with respect to any interpretation paths that begin with a different command agent. When all such hints have been generated, control returns to step 316 (FIG. 3) where they are added to the InterpretationActuation object (if not already there). In step 318, the InterpretationActuation object is forwarded to the interaction agent 110.

The hints included in the InterpretationActuation object provide much flexibility in the way the interaction agent 110 presents results and offers hints to the user for follow-up. As one example, the organization of hints in the XML format described above lends itself easily to a menu-type interface.

Figure 9:
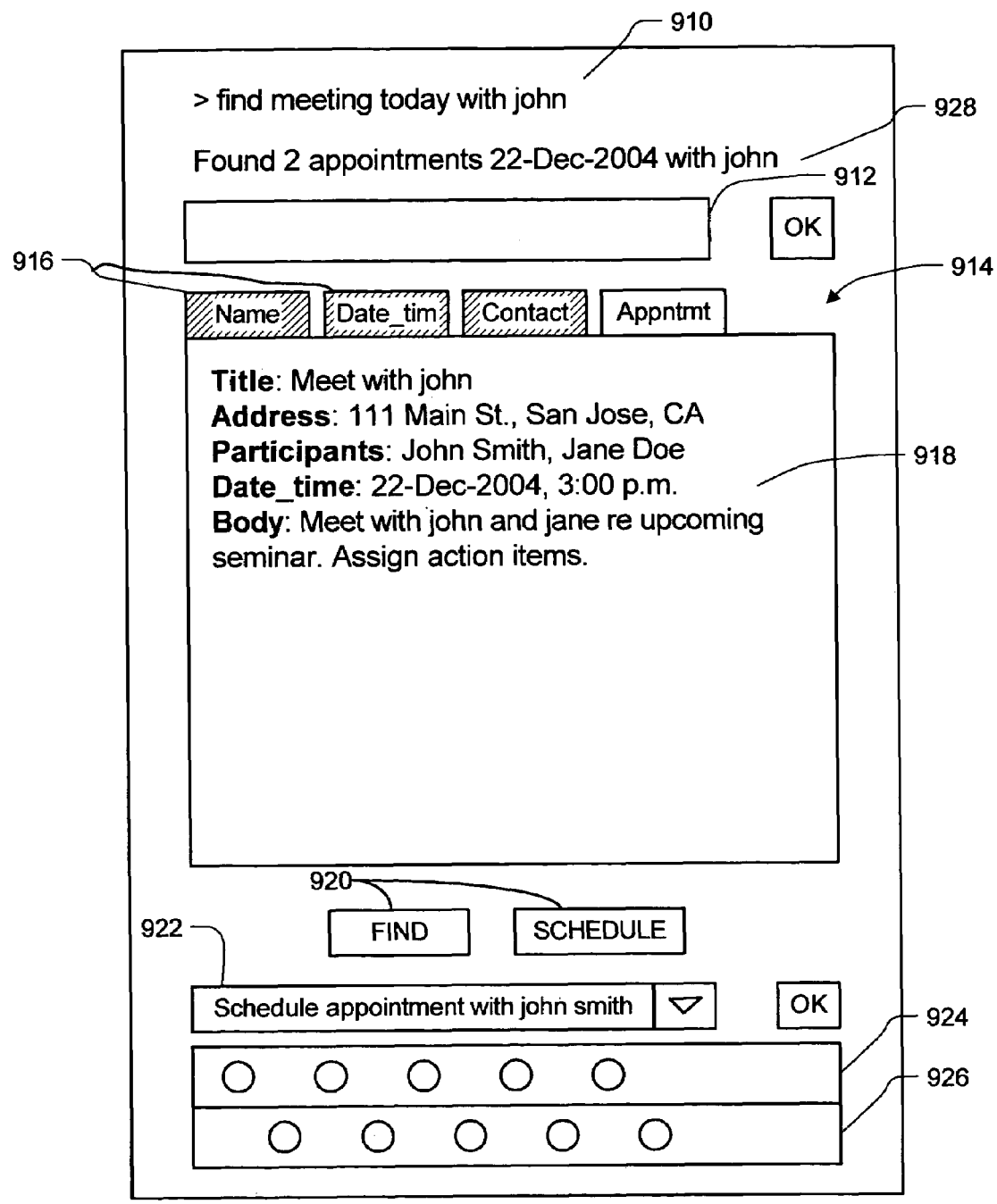
FIG. 9 illustrates an example layout that might be used with the invention on a mobile device.

FIG. 9 illustrates another example layout that might be used advantageously on a mobile device. It includes the following elements.

Element 910 is a field in which the system shows the user input to which it has responded.

Element 928 is a Response Box. This is an area used by the system to explain to the user what is being displayed, to interact with the user in order to clarify natural language input, or to ask for additional information necessary to carry out the user's request. For example, if the system found 2 meetings scheduled today with John, the system can use the Response Box to ask which one is desired or to offer a hint such as, "You can narrow down your request by entering a Contact LastName, Contact Employer, Contact Phone, AppointmentAddress, AppointmentBody or AppointmentTitle." In an embodiment, some items offered by the system in this area can be clicked to show a pop-up containing options that are relevant to the current contextual state. For example if a user enters a search expression in the request box such as: "contacts in san jose", the response box will have an explanation such as: "Finding contacts in City San Jose". The user then can click on the word "San Jose" in the response box and select from a pop-up containing such options as "Meetings in San Jose" or "Companies in San Jose". These pop-ups are populated by the interaction agent 110 from the hints provided by the actuation agent 112.

Element 912 is a Request Box. Using this text area, users can not only enter natural language requests to the system (including providing the further clarification requested in the Response Box 928), but enter other expressions such as web site URLs or keyword searches. The system is able to distinguish different types of entry, and send natural language requests into the interpretation network 114.

Element 914 is the workspace. At any given time, the main topic of interest is displayed in this area. The ultimate responsibility for the content displayed in the workspace lies with the back-end applications and services, but in order to minimize any requirement that the back-end application provide a GUI specifically for mobile devices, in most cases the interaction agent 110 will format and present the content in a usable manner for the form factor of the particular device. The information presented comes from the interpretation made by the network 114 and the results returned by the back-end application(s) in step 312 (FIG. 3), both of which are present in the InterpretationActuation object.

The workspace includes several tabs 916, one for each object agent included in the interpretation. As previously mentioned, for the user input "find meeting today with john" and the network of FIG. 2, the object agents included in the interpretation are the Appointment, Contact, Date_time and Name agents.

The workspace also includes a body area 918. When the user selects one of the tabs 916, the body area displays the result of applying the user command on the object, typically as returned from the back-end application. The results returned may be simply the object fields with values returned from the back-end application, or they may be more than that. For example if a user request is to "Highlight hotels in a map of San Francisco", the result displayed in body area 918 might be an image of a map of San Francisco with hotels highlighted on the map.

Elements 920 are buttons which the user can select in order to perform specific actions on the object of the selected tab. For the Appointment tab, for example, Find and Schedule buttons are available. The interaction agent 110 derives these buttons from the Relevant Commands hints developed in step 812 for the particular object of the selected tab. Since this hint includes only those command agents immediately upchain of the object agent in the agent network, only commands that apply to the selected object are made available. Since the Reply command agent 216 is not immediately upchain of the Appointment agent 228, for example, no Reply button is presented when the user has selected the Appointment tab 916. In other words, actions and commands most relevant to the current discourse and topic are made available here. For smaller screen spaces, they might be made available in a menu format or drop-down list instead of buttons.

Element 922 is a drop down box that the interaction agent has populated with all of the hints returned in the InterpretationActuation object. In one embodiment, the interaction agent 110 creates the display hints merely by stringing together the names of the agents in the alternative path defined by each hint. In another embodiment, each agent in the agent network has an associated display expression, and the interaction agent creates the display hints by stringing together the display expressions of the agents in the alternative path defined by each hint. In yet another embodiment, the interaction agent uses a natural language converter to convert the semantic domains represented by the agents in the alternative path, to prose. Other methods will be apparent to the reader.

Element 924 is a Context Ribbon containing icons for each object agent in the network that has an associated group name in common with a group name associated with the object agent of the selected tab. The object agents to be represented in the Context Ribbon are all available from the hints, as are all the commands applicable to such object agents (see steps 826 and 828 in FIG. 8). For example, if the object agent of the currently selected tab is "restaurants", and the "restaurants" agent has associations with the groups "places" and "outdoor entertainment", then all other object agents associated with either of these two groups are included in the context ribbon. Additional information about the Context Ribbon is set forth below.

Element 926 is a Fixed Ribbon: Applications that are general enough in nature that are useful in most situations and in most of the time are accessible from icons in the fixed ribbon. The items on this ribbon do not change depending on the user input, and thereby help to provide an anchor for the user experience. The Fixed Ribbon also includes an icon to access user preferences (also called a profile herein). The database underlying this icon serves as a repository of user preferences acquired explicitly from the user through interactions and dialogs, or implicitly through user behavior. An example of explicit acquisition of user preferences is a shopping list, stored by the user for future reference. When information vital to fulfilling a user request is not available, the system dialogs back with the user and asks for the missing information. Depending on the importance and generality of this information to the application domain, it can then be stored in the preferences repository for future reference. For instance a user shopping for clothes may need to find an item his or her size. If the size information is not available in the preferences already, the system will dialog back to the user asking that information, and then store it in the preferences repository for future use. This is an effective way to collect user preferences since it does not require users to fill out forms to set up their systems. The method is particularly useful for a system in which the application set may be changing through time, since it avoids forcing the user to fill out a new form every time a new application or service is added.

When the user selects a hint, by selecting a user interface feature that was populated using a hint returned from the actuation agent 112, the system executes the new command represented by the hint. Different embodiments can use different mechanisms for causing the system to execute this command. In one embodiment, each hint returned from the actuation agent 112 also includes a constructed return token string that the actuation agent knows would be processed by the natural language interpretation network 114 in such a way as to create an interpretation path through the agent network that matches the alternative interpretation path represented by the hint. For example, in many agent networks, each interpretation agent has an associated "keyword" (and a list of synonyms for that keyword), and includes a policy condition that will recognize that keyword and all its synonyms. A keyword is usually a straightforward word that would likely be entered by a user who knows the agent network. Often it is the same as the name of the agent. Also it may or may not be the same as the words in the hint that represent that interpretation agent for purposes of display to the user. In this embodiment the interaction agent 110, upon detection that the user has selected a particular hint, forwards back into the interpretation network 114 the constructed token string that had been associated with the selected hint. Other embodiments can use other mechanisms for causing the system to execute the command associated with a user-selected hint, including mechanisms that bypass the interpretation network 114 and go directly to the actuation agent 112 or the back-end application.

When the user selects an icon on the Context Ribbon, instead of immediately converting the selected hint to a command for the back-end application, the system will first display a form. The form displays all the field names of the object represented by the selected icon, and suggested values are made available in a drop-down list for one or more of the fields in that form based on the user's current context. The user can accept the form as-is and issue a commit indication (e.g. by clicking on a "submit" button), or the user can first change the field values or fill in values for fields. Once the user issues a commit indication, the form is forwarded to the back-end application as a command.

In one embodiment, the system takes further advantage of the hints by displaying not only the form, but also user interface items representing each command applicable to the selected object. For example, if the object agent represented by the Context Ribbon user interface object selected by the user is an InboxMessage object, then the form might display fields for "From" and "Received Date", as well as command buttons for "Reply", "Forward" and "Find" (see the network of FIG. 2). The user indicates a commit by selecting one of the command buttons, and that is then the command that is forwarded to the back-end application with the form values.

There are at least two methods that can be used for determining which fields to display in the form. In one embodiment, the system uses an API of the back-end application to retrieve the list of relevant fields. In another embodiment, the system merely lists all field agents (and relation agents) that are immediately downchain in the agent network from the user-selected object agent. In either case, the system gives suggestions for field values for as many fields as it can based on the user's current context.

The current context information used to give suggestions for field values, in one embodiment, comes from the recent history of prior interactions between the user and the system. For example, if the recent user inputs include mention of a field value, then those field values are suggested for that field in the form. Or if the response from the back-end application includes a field value that can be identified as most likely the response that the user's input intended, then that field value might be suggested for that field in the form.

In another embodiment, the current context information used to give suggestion for (or pre-fill) fields can come from external sources, such as current location information from a GPS receiver, or from the local user profile database. For example, if the user's current location is in Palo Alto, and the object in the Context Ribbon selected by the user is a hotel, then the system might display a form for finding a hotel, with the "city" and "state" fields pre-filled with "Palo Alto" and "California", respectively. As another example, for an online shopping back-end application, if the user's profile specifies that the user wears a size 10 shoe, and the object in the Context Ribbon selected by the user represents shoes, then the system might display a form for finding shoes, with the shoe size field pre-filled with size 10.

In yet another embodiment, the system does not create the form at all. Instead, control of the appropriate screen space is given to the back-end application, or to another third party entity, which is then responsible for displaying the form. The back-end application or third party entity can use an API of the system 100 to request values with which to pre-fill fields. The system can provide such values in the same manner as set forth above. When the user issues the commit indication, in one embodiment the indication is passed directly to the entity that controls the form, whereas in another embodiment the indication is returned to the interaction agent 110 for processing in the manner set forth above.

In the embodiment of FIG. 9, the items represented in the Context Ribbon are those sharing a common group name with the object agent of the selected tab 916. In other embodiments, other kinds of relationships can be used to determine in a contextually relevant way what items to represent in the Context Ribbon. Many of the same kinds of relationships can be used here as are mentioned above for pre-filling field values. For example items can be included which have a relationship with the selected tab because of the user's current context outside of the user interaction with the system ("external context"), or items can be included which have a relationship with the selected tab because of the user's current profile. In one embodiment the current location of the user is used to narrow down the object agents to be represented in the Context Ribbon. If the user is in Palo Alto, for example, and the object in the selected tab is a hotel also in Palo Alto, then an "air travel" object will not be shown in the Context Ribbon because the destination is too close to the user's current location. In another embodiment the items shown in the Context Ribbon are affected by the user's profile. A "train schedule" icon will not be shown (or will be shown only at the end of the Context Ribbon), for example, if the user's profile indicates that the user always travels by car.

As previously mentioned, the Actuation agent 112 in certain embodiments has the ability to issue commands to more than one back-end application. This ability permits the system to be designed so as to closely integrate the functions of the different back-end applications. It was mentioned above, for example, that for a map application to be integrated into the RIM Blackberry application set, one would expect to be able to easily get a map of a contact while viewing the contact information. This is now easily accomplished using techniques described herein, simply by including agents in the agent network that are appropriate to both kinds of applications. If the user input is, for example, "What's John Smith's address?", the actuation agent might forward an appropriate query to a back-end contacts manager application. The response is displayed in display region 914 (FIG. 9). If the agent network includes a "map" command agent upchain of "contact address" object agent which is in turn downchain from the contact object agent, then the Relevant Commands hints algorithm will produce a hint for "map John Smith's address". This hint will be available to the user in the hints drop-down list 922. If selected by the user, this hint will cause an actuation to be sent to the Actuation Agent 112 that the Actuation Agent 112 will recognize as appropriate for the mapping application rather than the contacts manager application. The Actuation Agent 112 will issue the appropriate command and return the map image response to the user via the interaction agent 110. Alternatively or additionally, the system may produce a "map" icon for the Context Ribbon 924. If selected by the user, the system will bring up a form for a map object, including one or more fillable fields. The "address" field on this form will have its value pre-filled with John Smith's address as returned from the most recent user interaction.

FIG. 9 is an example of a display of a GUI page. As used herein, a "GUI page" is a display of user interface items or elements, including backup elements (such as drop-down lists and pop-ups) and scripted behavior which become visible or otherwise perceptible only in response to predetermined user behaviors. A GUI page differs from the entire GUI in that all the information necessary to present a GUI page are available to the interface at once. Back-up elements or behaviors which require returning to the natural language interface to populate, are not considered part of the GUI "page".

Figure 10:
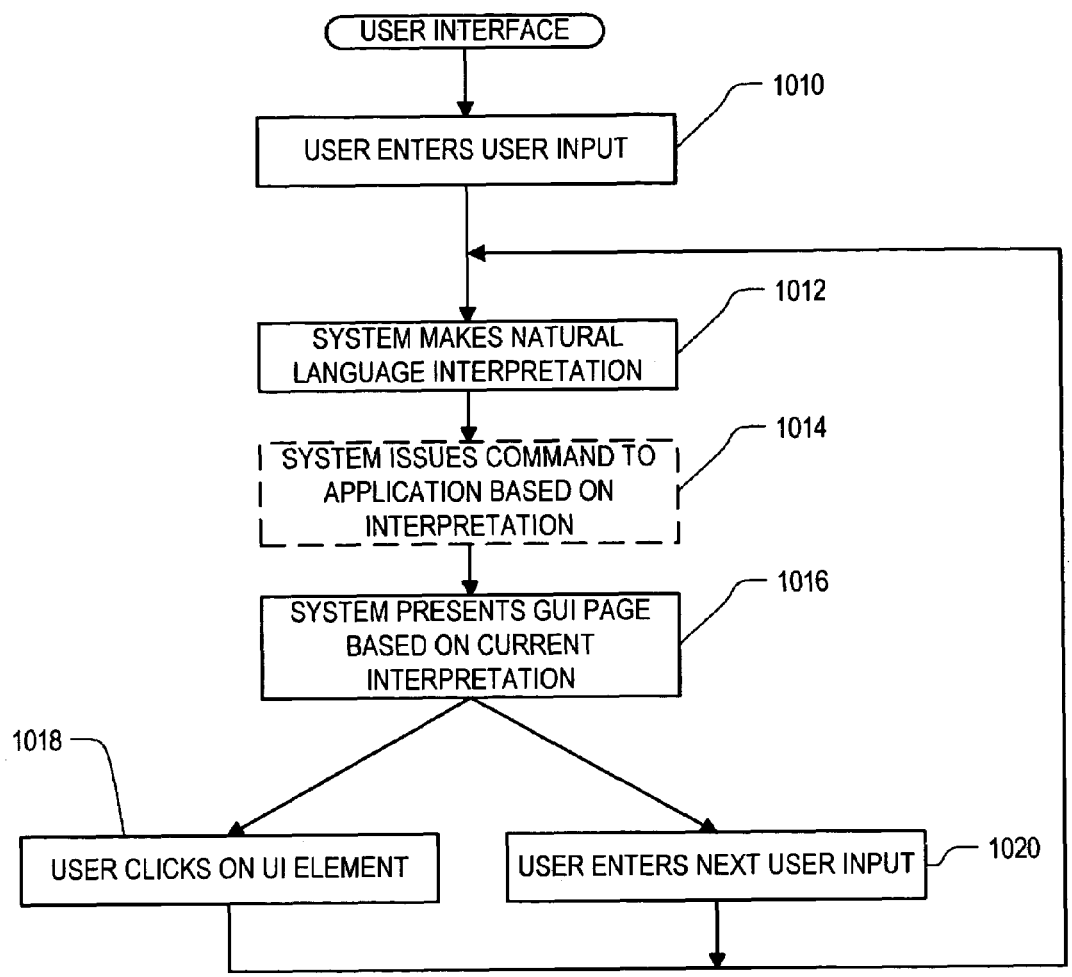
FIG. 10 is a flow chart illustrating example steps that might be performed using an interface such as that shown in FIG. 9.

As can be seen in the example of FIG. 9, a graphical user interface that both drives and is driven by a natural language interpreter can be extremely powerful. A wholly new browsing paradigm becomes possible, in which natural language interpretation operates hand-in-hand with the GUI. FIG. 10 is a flow chart illustrating example steps that might be performed according to such a paradigm.

In step 1010, the user enters user input. This input can be in natural language form, that is it can be expressed as freely and naturally as in ordinary speech. In step 1012, the system makes a first natural language interpretation of the first user input. In step 1014, depending on the interpretation, the system may then issue a command to the back-end application based on interpretation. In step 1016, the system presents GUI page to the user based on current interpretation. As in FIG. 9, the GUI page includes numerous features that are directly dependent upon the recent history of the user's interaction with the system, and therefore appears to be context aware. Also as in FIG. 9, the GUI page includes many user interface elements that have constructed return token strings associated with them, so in step 1018, if the user selects one of such elements, the associated return token string will be re-submitted to the natural language interpreter for a new interpretation (returning to step 1012). Alternatively, the GUI page may include a more conventional user entry field (a text entry box, or a feature to click in order to receive speech, etc.), in which the user can enter new or follow-up user input. This too will be re-submitted to the natural language interpreter for a new interpretation (step 1012 again). Note that if the natural language interpreter is so designed, it can detect user input here representing non-natural-language expressions, such as web site URLs or keyword searches, and handle them appropriately. It can be seen that the browsing paradigm of FIG. 10 allows users to quickly and naturally navigate complex back-end applications, without having to explore unfamiliar or lengthy menu structures, without requiring a large display, and without numerous interactions with the back-end application.

It can be seen that embodiments of the invention can be developed which tightly integrate multiple back-end applications together, without requiring any re-write of the back-end applications or their API's, and without requiring any cooperation between development teams from different application vendors. The system allows the user to enter the same or a different application with an entry point that is determined by the context he or she is in at the time of the selection, with form values pre-filled by default using the contextual clues available at the time of the selection.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A user interface method, for use with an application that accepts commands, comprising the steps of:
    developing a first natural language interpretation of at least a portion of first user input;
    presenting a first GUI page in dependence upon the first interpretation, the first GUI page having a plurality of user interface elements each having a respective return token string associated therewith, the GUI page further having a first field for further user input;
    developing a second natural language interpretation of the return token string associated with a first one of the user interface elements, in response to user selection of the first user interface element;
    presenting a second GUI page in dependence upon the second interpretation, the second GUI page having a plurality of user interface elements each having a respective return token string associated therewith, the second GUI page further having a second field for further user input;
    developing a third natural language interpretation of second user input entered into the second field;
    presenting a third GUI page in dependence upon the third interpretation, the third GUI page having a plurality of user interface elements each having a respective return token string associated therewith, the third GUI page further having a third field for further user input;
    developing a fourth natural language interpretation of the return token string associated with a second one of the user interface elements, in response to user selection of the second user interface element, and
    developing a fourth natural language interpretation of third user input entered into the third field.

2. A method according to claim 1, further comprising the step of issuing a command toward the application in dependence upon the first interpretation.

3. A method according to claim 1, further comprising the step of issuing a command toward the application in dependence upon the second interpretation.

4. A method according to claim 1, further comprising the step of issuing a command toward the application in dependence upon the third interpretation.

5. A user interface method, for use with an application that accepts commands, comprising the steps of:
    developing a first natural language interpretation of at least a portion of first user input;
    presenting a first GUI page in dependence upon the first interpretation, the first GUI page having a plurality of user interface elements, each having a respective return token string associated therewith;
    developing a second natural language interpretation in dependence upon a member of the group consisting of second user input and the return token string associated with one of the user interface elements selected by the user;
    presenting a second GUI page in dependence upon the second interpretation, the second GUI page having a plurality of user interface elements, each having a respective return token string associated therewith;
    wherein a first one of the user interface elements in the first GUI page has a first appearance identical to that of a second one of the user interface items in the second GUI page, but the return token string associated with the first user interface element differs from the return token string associated with the second user interface element.

6. A method according to claim 5, further comprising the steps of:
    issuing a first command toward the application in dependence upon user selection of the first user interface element in the first GUI page; and
    issuing a second command toward the application in dependence upon user selection of the second user interface element in the second GUI page,
    wherein the first and second commands are different.

* * * * *